United States Patent
Herzog et al.

(10) Patent No.: US 6,892,163 B1
(45) Date of Patent: May 10, 2005

(54) SURVEILLANCE SYSTEM AND METHOD HAVING AN ADAPTIVE SEQUENTIAL PROBABILITY FAULT DETECTION TEST

(75) Inventors: James P. Herzog, Downers Grove, IL (US); Randall L. Bickford, Orangevale, CA (US)

(73) Assignee: Intellectual Assets LLC, Lake Tahoe, NV (US)

( * ) Notice: Subject to any disclaimer, the term of this patent is extended or adjusted under 35 U.S.C. 154(b) by 129 days.

(21) Appl. No.: 10/095,835

(22) Filed: Mar. 8, 2002

(Under 37 CFR 1.47)

(51) Int. Cl.[7] .............................................. G01R 17/00
(52) U.S. Cl. ........................................ 702/181; 700/30
(58) Field of Search .......................... 702/183, 72, 189, 702/185, 181; 700/30, 29; 714/26; 706/15

(56) References Cited

U.S. PATENT DOCUMENTS

| | | | | |
|---|---|---|---|---|
| 5,223,207 A | * | 6/1993 | Gross et al. ................. | 376/216 |
| 5,410,492 A | * | 4/1995 | Gross et al. ................. | 702/185 |
| 5,459,675 A | * | 10/1995 | Gross et al. ................. | 702/183 |
| 5,586,066 A | * | 12/1996 | White et al. ................. | 702/181 |
| 5,629,872 A | * | 5/1997 | Gross et al. ................. | 702/116 |
| 5,680,409 A | * | 10/1997 | Qin et al. ................... | 714/799 |
| 5,745,382 A | * | 4/1998 | Vilim et al. .................. | 706/16 |
| 5,761,090 A | * | 6/1998 | Gross et al. ................. | 714/26 |
| 5,764,509 A | * | 6/1998 | Gross et al. ................. | 700/29 |
| 5,774,379 A | * | 6/1998 | Gross et al. ................. | 702/72 |
| 5,987,399 A | * | 11/1999 | Wegerich et al. ........... | 702/183 |
| 6,107,919 A | * | 8/2000 | Wilks et al. ................. | 340/511 |
| 6,119,111 A | * | 9/2000 | Gross et al. ................. | 706/15 |
| 6,131,076 A | * | 10/2000 | Stephan et al. ............. | 702/189 |
| 6,181,975 B1 | * | 1/2001 | Gross et al. ................. | 700/29 |
| 6,202,038 B1 | * | 3/2001 | Wegerich et al. ........... | 702/183 |
| 6,240,372 B1 | * | 5/2001 | Gross et al. ................. | 702/71 |
| 6,245,517 B1 | * | 6/2001 | Chen et al. .................. | 435/6 |
| 6,609,036 B1 | * | 8/2003 | Bickford ...................... | 700/30 |
| 6,625,569 B2 | * | 9/2003 | James et al. ................. | 702/183 |
| 2001/0049590 A1 | * | 12/2001 | Wegerich ..................... | 702/189 |
| 2004/0002776 A1 | * | 1/2004 | Bickford ...................... | 700/30 |
| 2004/0006398 A1 | * | 1/2004 | Bickford ...................... | 700/30 |

OTHER PUBLICATIONS

Hylko, J.M., New AI Technique Detects Instruments, Power, Nov. 1998, Printed in USA by Power.

Herzog, J.P., et al, MSET Modeling of Crystal River–3 Venturi Flow Meters, 6th International Conference on Nuclear Engineering, 1998, Printed in USA by ASME.

Bickford, R.L., et al, Real–Time Space Shuttle Main Engine Sensor Validation, National Aeronautics and Space Administration, Augg. 1995, Printed in USA by ExperTech & Intelligent Software Associates, Inc.

Bickford, R.L., et al, Real–Time Flight Data Validation For Rocket Engines, AIAA, 1996, Printed in USA by ExperTech & NYMA, Inc.

Bickford, R.L., et al, Real–Time Sensor Validation for Autonomous Flight Control, AIAA, Jul. 1997, Printed in USA by Expert Microsystems, Inc. & Intelligent Software Associates, Inc. & Beoing Defense and Space Group.

Bickford, R.L., et al, Real–Time Sensor Validation For Propulsion Systems, American Institute of Aeronautics and Astronautics, 1998, Printed in USA by Expert Microsystems, Inc & Dynacs Engineering Co.

(Continued)

*Primary Examiner*—John Barlow
*Assistant Examiner*—Victor J. Taylor
(74) *Attorney, Agent, or Firm*—Dennis A. DeBoo

(57) ABSTRACT

System and method providing surveillance of an asset such as a process and/or apparatus by providing training and surveillance procedures that numerically fit a probability density function to an observed residual error signal distribution that is correlative to normal asset operation and then utilizes the fitted probability density function in a dynamic statistical hypothesis test for providing improved asset surveillance.

32 Claims, 20 Drawing Sheets

OTHER PUBLICATIONS

Bickford, R.L., et al, Real–Time Sensor Data Validation For Space Shuttle Main Engine Telemetry Monitoring, AIAA, Jun. 1999, Printed in USA by Expert Microsystems, Inc.& Intelligent Software Associates, Inc. & Dynacs Engineering Company & NASA Glenn Research Center.

Singer, R.M., et al, A Pattern–recognition–based, Fault–tolerant Monitoring and Diagnostic Technique, 7th Symp. on Nuclear Reactor Surveillance, Jun. 1995, Printed in USA by Argonne National Laboratory.

Bickford, R.L., et al, Online Signal Validation for Assured Data Integrity, 47th International Instrumentation Symposium, May 2001, Printed in USA by Expert Microsystems, Inc., and NASA Glenn Research Center.

Wegerich, S., et al, Challenges Facing Equipment Condition Monitoring Systems, MARCOM 2001, May 2001, Printed in USA by SmartSignal Corporation.

Zavaljevski, N., et al, Sensor Fault Detection in Nuclear Power Plants Using Multivariate State Estimation Technique and Support Vector Machines, 3rd Intl. Conf. of Yugoslav Nuclear Society, Oct. 2000, Printed in USA by Argonne National Laboratory.

Zavaljevski, N., et al, Support Vector Machines for Nuclear Reactor State Estimation, ANS Topical Mtg. on Advances in Reactor Physics, May 2000, Printed in USA by Argonne National Laboratory.

Bickford, R.L., et al, Sensor Validation Tools and SSME Network, Final Report, Apr. 2000, Printed in USA by Expert Microsystems, Inc.

Miron, A., et al, The Effects of Parameter Variation on MSET Models of the Crystal River–3 Feedwater Flow System, ANS Annual Meeting, Jun. 1998, Printed in USA by Argonne National Laboratory.

Wrest, D.J., et al., Instrument Surveillance and Calibration Verification through Plant Wide Monitoring Using Autoassociative Neural Networks, Specialists Meeting on Monitoring and Diagnosis Systems to Improve Nuclear Power Plant Reliability and Safety, May 1996, printed by the International Atomic Energy Agency.

K. Humenik, et al, Sequential Probability Ratio Tests for Reactor Signal Validation and Sensor Surveillance Applications, Nuclear Science and Engineering, vol. 105, pp 383–390, 1990.

K.C. Gross, et al, Sequential Probability Ratio Test for Nuclear Plant Component Surveillance, Nuclear Technology, vol. 93, p. 131, Feb. 1991.

A. Racz, Comments on the Sequential Probability Ratio Testing Methods, Annals of Nuclear Energy, vol. 23, No. 11, pp. 919–934, 1996.

K. Kulacsy, Further Comments on the Sequential Probability Ratio Testing Methods, prepared for Annals of Nuclear Energy by the KFKI Atomic Energy Research Institute, Budapest, Hungary, Report No. KFKI–10/G, 1996.

R. M. Singer, et al, Model–Based Nuclear Power Plant Monitoring and Fault Detection: Theoretical Foundations, Proceedings, 9th International Conference on Intelligent Systems Applications to Power Systems, Seoul, Korea, 1997.

K.C. Gross, et al, Application of a Model–based Fault Detection System to Nuclear Plant Signals, Proceedings 9th International Conference on Intelligent Systems Applications to Power Systems, Seoul, Korea, 1997.

R. M. Singer, et al, Power Plant Surveillance and Fault Detection: Applications to a Commercial PWR, International Atomic Energy Agency, IAEA–TECDOC–1054, pp. 185–200, Sep. 1997.

K. Kulacsy, Tests of the Bayesian Evaluation of SPRT Outcomes on PAKS NPP Data, KFKI Atomic Energy Research Institute, Budapest, Hungary, Report No. KFKI–1997–07/G, 1997.

J.P. Herzog, et al, Dynamics Sensor Validation for Reusable Launch Vehicle Propulsion, AIAA 98–3604, 34th Joint Propulsion Conference, Cleveland, Ohio, 1998.

* cited by examiner

| Sensor Number | Gaussian | One-Term Series Expansion | Two-Term Series Expansion | Three-Term Series Expansion | Four-Term Series Expansion |
|---|---|---|---|---|---|
| 1 | 0.414 | 0.409 | 0.122 | 0.151 | 2.06 |
| 2 | 0.389 | 0.396 | 0.147 | 0.223 | 2.13 |
| 3 | 0.233 | 0.234 | 0.0605 | 0.0651 | 0.171 |
| 4 | 0.339 | 0.320 | 0.0964 | 0.146 | 0.256 |
| 5 | 0.156 | 0.167 | 0.121 | 0.0985 | 0.0983 |
| 6 | 0.180 | 0.134 | 0.107 | 0.326 | 0.656 |

Figure 17

| Sensor Number | Gaussian | One-Term Series Expansion | Two-Term Series Expansion | Three-Term Series Expansion | Four-Term Series Expansion |
|---|---|---|---|---|---|
| 1 | 0.414 | 0.176 | 0.0826 | 0.0755 | 0.0899 |
| 2 | 0.389 | 0.174 | 0.0811 | 0.0816 | 0.0659 |
| 3 | 0.233 | 0.122 | 0.0522 | 0.0573 | 0.0522 |
| 4 | 0.339 | 0.166 | 0.0706 | 0.0726 | 0.0713 |
| 5 | 0.156 | 0.0699 | 0.0394 | 0.0352 | 0.0373 |
| 6 | 0.180 | 0.0710 | 0.0346 | 0.0352 | 0.0369 |

Figure 18

SURVEILLANCE SYSTEM AND METHOD HAVING AN ADAPTIVE SEQUENTIAL PROBABILITY FAULT DETECTION TEST

STATEMENT REGARDING FEDERALLY SPONSORED RESEARCH AND DEVELOPMENT

The invention described herein was made in the performance of work under NASA Small Business Technology Transfer Research (STTR) Contract NAS8-98027, and is subject to the provisions of Public Law 96-517 (35 USC 202) and the Code of Federal Regulations 48 CFR 52.227-11 as modified by 48 CFR 1852.227-11, in which the contractor has elected to retain title.

The United States Government has rights in this invention pursuant to Contract No. W-31-109-ENG-38 between the United States Government and the University of Chicago representing Argonne National Laboratory.

FIELD OF THE INVENTION

The instant invention relates generally to a system and method for process fault detection using a statistically based decision test and, in particular, to a system and method for performing high sensitivity surveillance of an asset such as a process and/or apparatus wherein the surveillance is performed using an adaptive sequential probability (ASP) fault detection test comprised of a probability density function model empirically derived from a numerical analysis of asset operating data.

BACKGROUND OF THE INVENTION

Conventional process surveillance schemes are sensitive only to gross changes in the mean value of a process signal or to large steps or spikes that exceed some threshold limit value. These conventional methods suffer from either a large number of false alarms (if thresholds are set too close to normal operating levels) or from a large number of missed (or delayed) alarms (if the thresholds are set too expansively). Moreover, most conventional methods cannot perceive the onset of a process disturbance or sensor signal error that gives rise to a signal below the threshold level or an alarm condition. Most conventional methods also do not account for the relationship between measurements made by one sensor relative to another redundant sensor or between measurements made by one sensor relative to predicted values for the sensor.

Recently, improved methods for process surveillance have developed from the application of certain aspects of artificial intelligence technology. Specifically, parameter estimation methods have been developed using either statistical, mathematical or neural network techniques to learn a model of the normal patterns present in a system of process signals. After learning these patterns, the learned model is used as a parameter estimator to create one or more predicted (virtual) signals given a new observation of the actual process signals. Further, high sensitivity surveillance methods have been developed for detecting process and signal faults by analysis of a mathematical comparison between an actual process signal and its virtual signal counterpart. In particular, such a mathematical comparison is most often performed on a residual error signal computed as, for example, the difference between an actual process signal and its virtual signal counterpart.

Parameter estimation based surveillance schemes have been shown to provide improved surveillance relative to conventional schemes for a wide variety of assets including industrial, utility, business, medical, transportation, financial, and biological systems. However, parameter estimation based surveillance schemes have in general shown limited success when applied to complex processes. Applicants recognize and believe that this is because the parameter estimation model for a complex process will, in general, produce residual error signals having a non-Gaussian probability density function. Moreover, a review of the known prior-art discloses that virtually all such surveillance systems developed to date utilize or assume a Gaussian model of the residual error signal probability density function for fault detection. Hence, a significant shortcoming of the known prior-art is that, inter alia, parameter estimation based surveillance schemes will produce numerous false alarms due to the modeling error introduced by the assumption of a Gaussian residual error signal probability density function. The implication for parameter estimation based surveillance schemes is that the fault detection sensitivity must be significantly reduced to prevent false alarms thereby limiting the utility of the method for process surveillance. An alternative for statistically derived fault detection models is to mathematically pre-process the residual error signals to remove non-Gaussian elements prior to using the residual error signals in the fault detection model; however this approach requires an excess of additional processing and also limits the sensitivity of the surveillance method. Therefore, the implication of assuming a Gaussian residual error signal probability density function for a parameter estimation based surveillance scheme is simply that the system becomes less accurate thereby degrading the sensitivity and utility of the surveillance method.

Many attempts to apply statistical fault detection techniques to surveillance of assets such as industrial, utility, business, medical, transportation, financial, and biological processes have met with poor results in part because the fault detection models used or assumed a Gaussian residual error signal probability density function.

In one specific example, a multivariate state estimation technique based surveillance system for the Space Shuttle Main Engine's telemetry data was found to produce numerous false alarms when a Gaussian residual error fault detection model was used for surveillance. In this case, the surveillance system's fault detection threshold parameters were desensitized to reduce the false alarm rate; however, the missed alarm rate then became too high for practical use in the telemetry data monitoring application.

Moreover, current fault detection techniques for surveillance of assets such as industrial, utility, business, medical, transportation, financial, and biological processes either fail to recognize the surveillance performance limitations that occur when a Gaussian residual error model is used or, recognizing such limitations, attempt to artificially conform the observed residual error data to fit the Gaussian model. This may be attributed, in part, to the relative immaturity of the field of artificial intelligence and computer-assisted surveillance with regard to real-world process control applications. Additionally, a general failure to recognize the specific limitations that a Gaussian residual error model imposes on fault decision accuracy for computer-assisted surveillance is punctuated by an apparent lack of known prior art teachings that address potential methods to overcome this limitation. In general, the known prior-art teaches computer-assisted surveillance solutions that either ignore the limitations of the Gaussian model for reasons of mathematical convenience or attempt to conform the actual residual error data to artificial Gaussian model, for example, by using frequency domain filtering and signal whitening techniques.

For the foregoing reasons, there is a need for a surveillance system and method that overcomes the significant shortcomings of the known prior-art as delineated hereinabove.

SUMMARY OF THE INVENTION

The instant invention is distinguished over the known prior art in a multiplicity of ways. For one thing, the instant invention provides a surveillance system and method having a fault detection model of unconstrained probability density function form and having a procedure suitable for overcoming a performance limiting trade-off between probability density function modeling complexity and decision accuracy that has been unrecognized by the known prior-art. Specifically, the instant invention can employ any one of a plurality of residual error probability density function model forms, including but not limited to a Gaussian form, thereby allowing a surveillance system to utilize the model form best suited for optimizing surveillance system performance.

Moreover, the instant invention provides a surveillance system and method that uses a computer-assisted learning procedure to automatically derive the most suitable form of the residual error probability density function model by observation and analysis of a time sequence of process signal data and by a combination of a plurality of techniques. This ability enables surveillance to be performed by the instant invention with lower false alarm rates and lower missed alarm rates than can be achieved by the known prior-art systems and methods.

Thus, the instant invention provides a surveillance system and method that performs its intended function much more effectively by enabling higher decision accuracy. Further, the instant invention is suitable for use with a plurality of parameter estimation methods thereby providing a capability to improve the decision performance of a wide variety of surveillance systems.

In one preferred form, the instant invention provides a surveillance system and method that creates and uses, for the purpose of process surveillance, a multivariate state estimation technique parameter estimation method in combination with a statistical hypothesis test fault detection method having a probability density function model empirically derived from a numerical analysis of asset operating data.

Particularly, the instant invention provides a surveillance system and method for providing surveillance of an asset such as a process and/or apparatus by providing training and surveillance procedures.

In accordance with the instant invention, the training procedure is comprised of a calibrate parameter estimator procedure and a calibrate fault detector procedure.

The calibrate parameter estimator procedure creates a parameter estimation model(s) and trains a parameter estimation model by utilizing training data correlative to expected asset operation and, for example, utilizing a multivariate state estimation technique (MSET) procedure. The calibrate parameter estimator procedure further stores this model as a new parameter estimation model in a process model. The process model may contain one or more parameter estimation models depending upon design requirements. Additionally, each parameter estimation model contained in the process model may be created to implement any one of a plurality of parameter estimation techniques.

The calibrate fault detector procedure makes use of the parameter estimation models to provide estimated values for at least one signal parameter contained in the training data. Generally, the calibrate fault detector procedure will create a separate and distinct fault detection model for each sensor or data signal associated with the asset being monitored for the presence of fault conditions during the surveillance procedure.

The calibrate fault detector procedure includes, for example, a method of fitting a standard Gaussian probability density function (PDF) to a training data residual distribution (computed as a function of estimated process parameters and the training data) and then adding successive higher order terms of a remainder function to the standard Gaussian PDF for the purpose of defining a general PDF that better fits the computed training data residual distribution. Other techniques for fitting a general PDF to the training data are similarly feasible and useful in accordance with the instant invention and include, for example, a technique for fitting a polynomial function to the training data.

The training procedure is completed when all training data has been used to calibrate the process model. At this point, the process model preferably includes parameter estimation models and fault detection models for each sensor or data signal associated with the asset being monitored for the presence of fault conditions during the surveillance procedure. The process model is thereafter used for performing surveillance of the asset.

The surveillance procedure is performed using an adaptive sequential probability (ASP) fault detection test comprised of the general probability density function model empirically derived from a numerical analysis of the asset training data.

The surveillance procedure acquires and digitizes current asset data and then estimates process parameters as a function of the acquired digitized current asset data and the parameter estimation model(s) obtained from the calibrate parameter estimator procedure. Then, fault detection is determined by first computing data residuals as a function of the estimated process parameters and the acquired digitized current asset data and then performing the ASP test(s) as a function of the fault detection models and thus, as a function of the fitted general PDF obtained in the calibrate fault detector procedure. Each ASP test returns one of three possible states: a not null state which rejects the probability that a null hypothesis is true and excepts an alternative hypothesis correlative to unexpected operation of the asset; a null state which accepts the probability that a null hypothesis is true and excepts the null hypothesis correlative to expected operation of the asset; and an in-between state which excepts neither the null hypothesis nor the alternative hypothesis as being true and requires more data to reach a conclusion.

The results of the fault detection procedure are then analyzed according to the instant invention such that an alarm and/or a control action are taken when the analysis determines that the results indicate unexpected operation of the asset.

Hence, the instant invention is distinguished over the known prior-art by providing a surveillance system and method for performing surveillance of an asset by acquiring residual data correlative to expected asset operation; fitting an equation to said acquired residual data; storing said fitted equation in a memory means; collecting a current set of observed signal data values from the asset; using said fitted equation in a sequential hypotheses test to determine if said current set of observed signal data values indicate unexpected operation of the asset indicative a fault condition; and outputting a signal correlative to each detected fault condition for providing asset surveillance.

OBJECTS OF THE INVENTION

Accordingly, the instant invention provides a new, novel and useful surveillance system and method having an adaptive sequential probability fault detection test.

In one embodiment of the instant invention the surveillance system and method includes an unconstrained form of a residual error probability density function model used in said surveillance system's fault detection method.

In one embodiment of the instant invention the surveillance system and method can perform high sensitivity surveillance of a wide variety of assets including industrial, utility, business, medical, transportation, financial, and biological processes and apparatuses wherein such process and/or apparatus asset preferably has at least one pair of redundant actual and/or virtual signals.

In one embodiment of the instant invention the surveillance system and method includes a statistical hypothesis test surveillance decision procedure that uses a fault detection model comprised of a probability density function model of a residual error signal that is of an unconstrained form.

In one embodiment of the instant invention the surveillance system and method creates an improved fault detection model for a process surveillance scheme using recorded operating data for an asset to train a fault detection model.

In one embodiment of the instant invention the surveillance system and method provides an improved system and method for surveillance of on-line, real-time signals, or off-line accumulated signal data.

In one embodiment of the instant invention the surveillance system and method provides an improved system and method for surveillance of signal sources and detecting a fault or error state of the signal sources enabling responsive action thereto.

In one embodiment of the instant invention the surveillance system and method provides an improved system and method for surveillance of signal sources and detecting a fault or error state of the asset processes and apparatuses enabling responsive action thereto.

In one embodiment of the instant invention the surveillance system and method provides an improved decision as to the accuracy or validity for at least one process signal parameter given an observation of at least one actual signal from the asset.

In one embodiment of the instant invention the surveillance system and method provides an improved system and method for ultra-sensitive detection of a fault or error state of signal sources and/or asset processes and apparatuses wherein the parameter estimation technique used for the generation of at least one virtual signal parameter is a multivariate state estimation technique (MSET) having any one of a plurality of pattern recognition matrix operators, training procedures, and operating procedures.

In one embodiment of the instant invention the surveillance system and method provides an improved system and method for ultra-sensitive detection of a fault or error state of signal sources and/or asset processes and apparatuses wherein the parameter estimation technique used for the generation of at least one virtual signal parameter is a neural network having any one of a plurality of structures, training procedures, and operating procedures.

In one embodiment of the instant invention the surveillance system and method provides an improved system and method for ultra-sensitive detection of a fault or error state of signal sources and/or asset processes and apparatuses wherein the parameter estimation technique used for the generation of at least one virtual signal parameter is a mathematical process model having any one of a plurality of structures, training procedures, and operating procedures.

In one embodiment of the instant invention the surveillance system and method provides an improved system and method for ultra-sensitive detection of a fault or error state of signal sources and/or asset processes and apparatuses wherein the parameter estimation technique used for the generation of at least one virtual signal parameter is an autoregressive moving average (ARMA) model having any one of a plurality of structures, training procedures, and operating procedures.

In one embodiment of the instant invention the surveillance system and method provides an improved system and method for ultra-sensitive detection of a fault or error state of signal sources and/or asset processes and apparatuses wherein the parameter estimation technique used for the generation of at least one virtual signal parameter is a Kalman filter model having any one of a plurality of structures, training procedures, and operating procedures.

In one embodiment of the instant invention the surveillance system and method provides a novel system and method for using at least one of a plurality of methods to classify the state of a residual error signal produced by the mathematical difference between two signals, said two signals being either actual and/or predicted signals, into one of at least two categories.

In one embodiment of the instant invention the surveillance system and method provides a novel system and method to classify the state of a residual error signal wherein said classification is made to distinguish between a normal signal and a abnormal signal.

In one embodiment of the instant invention the surveillance system and method provides a novel system and method to classify the state of a residual error signal wherein said classification is performed using a statistical hypothesis test having any one of a plurality of probability density function models, training procedures, and operating procedures.

In one embodiment of the instant invention the surveillance system and method provides a novel system and method to classify the state of a residual error signal wherein said classification is performed using a probability density function model having any one of a plurality of structures, training procedures, and operating procedures.

BRIEF DESCRIPTION OF THE DRAWINGS

FIG. 17 lists the root mean square errors for five different un-optimized probability density function models computed for each of six Space Shuttle Main Engine accelerometers used for feasibility testing of a preferred embodiment in accordance with the instant invention.

FIG. 18 lists the root mean square errors for five different optimized probability density function models computed for each of six Space Shuttle Main Engine accelerometers used for feasibility testing of a preferred embodiment in accordance with the instant invention.

DESCRIPTION OF PREFERRED EMBODIMENTS

Figure 1:
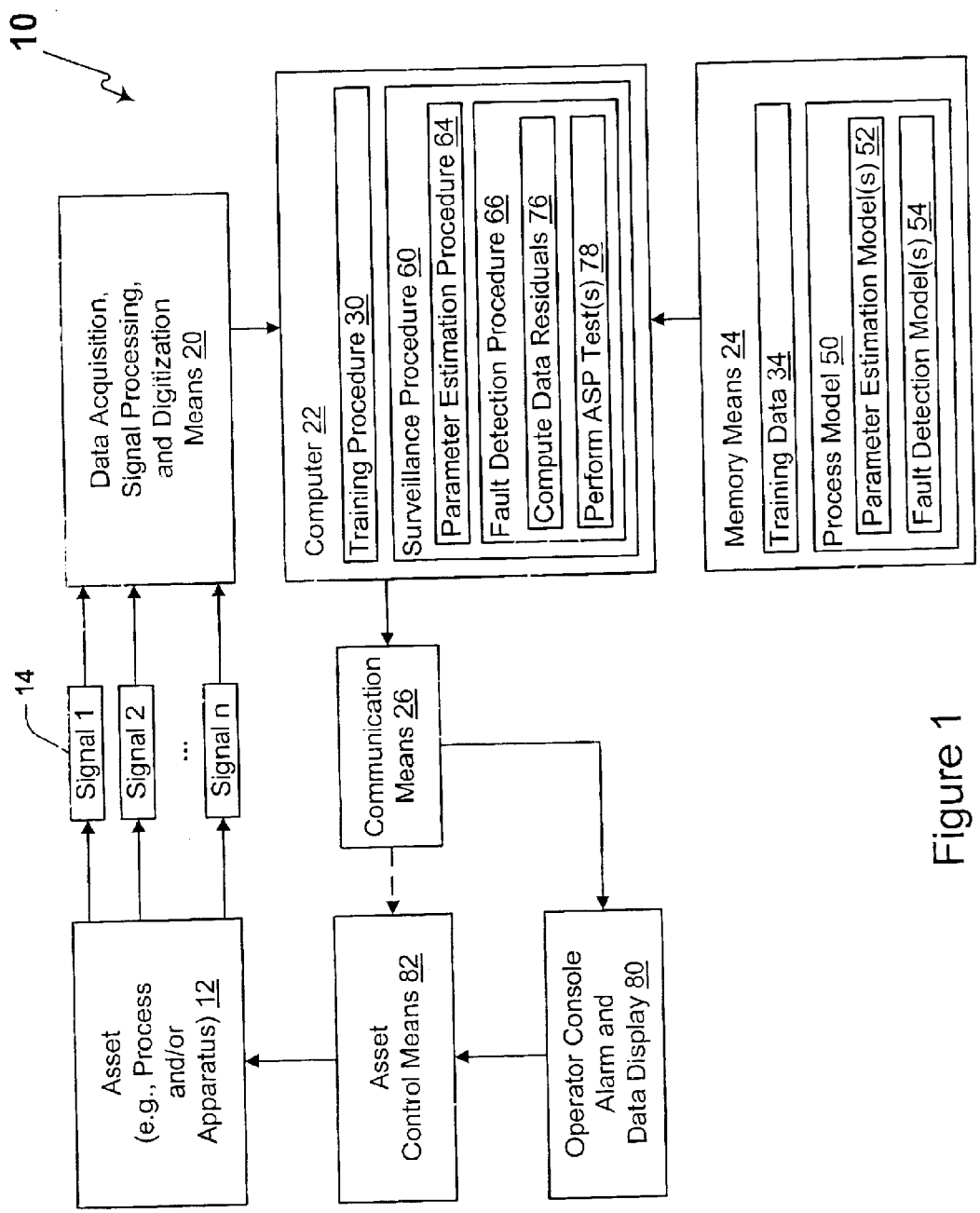
FIG. 1 is a block diagram of a surveillance system of a preferred embodiment in accordance with the instant invention.

Considering the drawings, wherein like reference numerals denote like parts throughout the various drawing figures, reference numeral 10 is directed to the system according to the instant invention.

Figure 2:
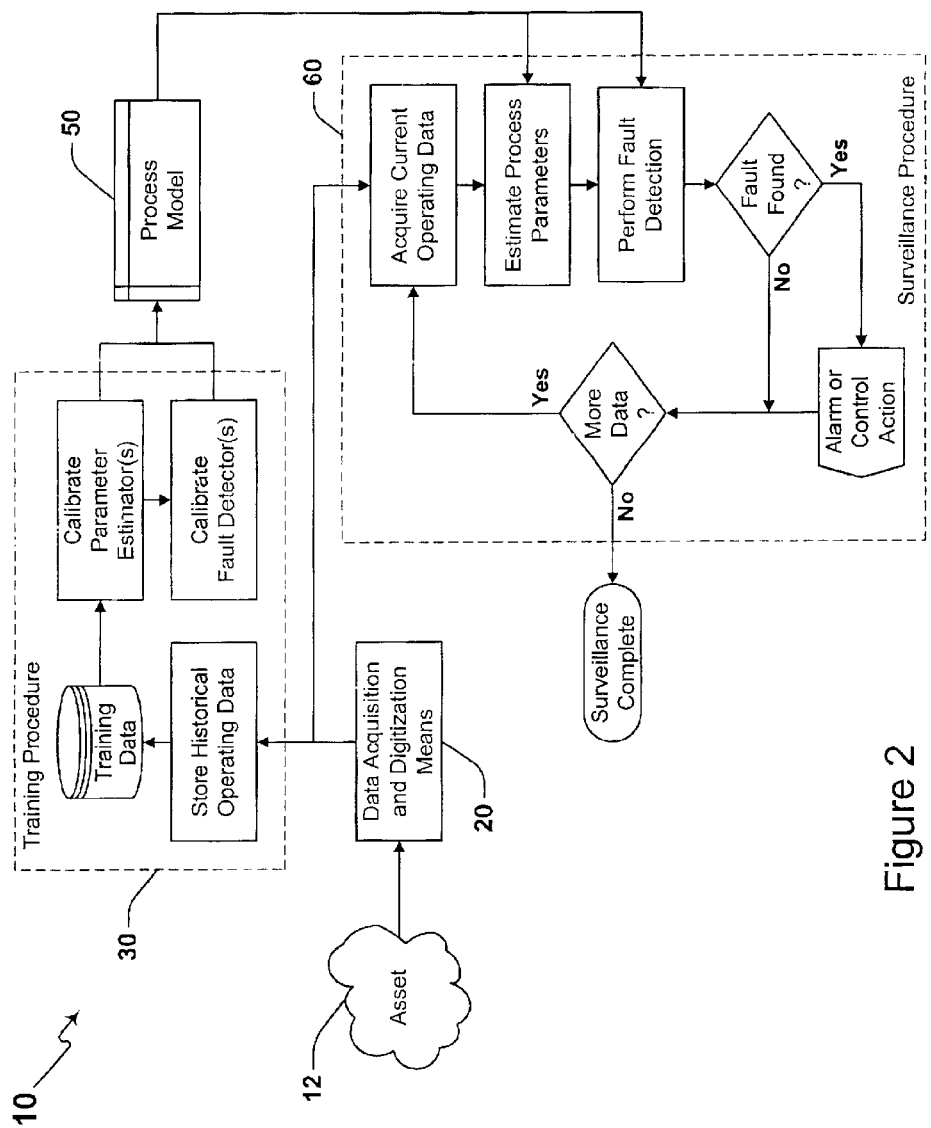
FIG. 2 is a schematic functional flow diagram of a preferred embodiment in accordance with the instant invention.

In its essence, and referring to FIGS. 1 and 2, the system 10 is generally comprised of a method and apparatus for performing high sensitivity surveillance of a wide variety of assets including industrial, utility, business, medical, transportation, financial, and biological processes and apparatuses wherein such process and/or apparatus asset preferably has at least one distinct measured or observed signal or sequence comprised of characteristic data values which are processed by the system 10 described herein for providing ultra-sensitive detection of the onset of sensor or data signal degradation, component performance degradation, and process operating anomalies. The system 10 includes a training procedure 30 carried out on a computer 22 such that a process model 50 of an asset 12 (e.g., a process and/or apparatus) is stored in an associated memory means 24 after being learned from historical operating data using at least one of a plurality of computer-assisted procedures in accordance with the instant invention. The historical operating data includes a set or range of observations from expected or typical operation of the asset 12 that are acquired and digitized by a data acquisition means 20 and stored in a memory means 24 as training data 34 by using any combination of electronic data acquisition hardware and signal processing software 20 known to those having ordinary skill in the art, and informed by the present disclosure. As will be delineated in detail infra, one hallmark of the instant invention is the process model 50 for the asset 12 that is derived during the training procedure 30.

The system 10 further includes a surveillance procedure 60 wherein the stored process model 50 is used for high sensitivity computer-assisted surveillance of the asset 12 for the purpose of determining whether a process fault or failure necessitates an alarm or control action. The process model 50 is comprised of a parameter estimation model 52 or collection of parameter estimation models 52 as necessary to provide an estimated value for each sensor or data signal 14 of asset 12 to be monitored for the presence of fault conditions during the surveillance procedure 60. The process model 50 is further comprised of a fault detection model 54 or collection of fault detection models 54 such that at least one fault detection model 54 is provided for each sensor or data signal 14 of asset 12 to be monitored for the presence of fault conditions during the surveillance procedure 60. The fault detection model 54 is another hallmark of the instant invention and will be delineated in further detail hereinbelow.

Process Model Training Procedure

Figure 3:
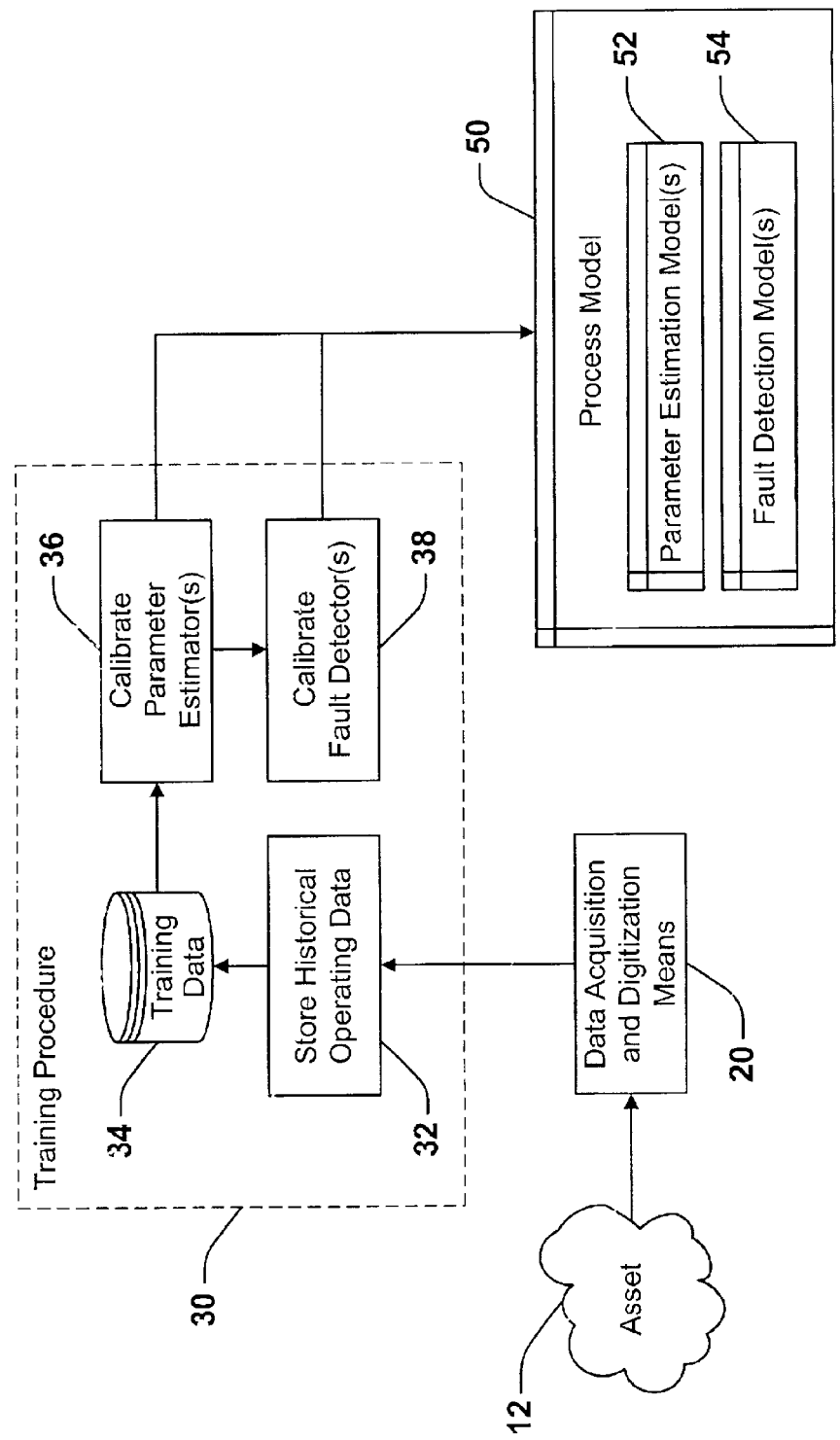
FIG. 3 is a schematic functional flow diagram of a preferred method and system for training a process model consisting of at least one parameter estimation model and at least one fault detection model using recorded observations of the actual process signals in accordance with the instant invention.

More specifically, and referring to FIGS. 1 and 3, the training procedure 30 of the system 10 includes a method and apparatus for training or preparing the process model 50 using historical operating data from the asset 12 that has been acquired by the data acquisition means 20 using any combination of conventional electronic data acquisition hardware and signal processing software as is well known in the art. The historical operating data is acquired in digital format and stored in memory means 24 using a data storage procedure 32 to create a training data set 34.

The training data set 34 includes at least N discrete observations of the asset 12 wherein each single observation, herein denoted Xobs, is comprised of a vector of data values for each signal parameter to be included in the process model 50. For the purposes of the training procedure 30, the number of observations, N, acquired is at least great enough to adequately bound the operating state space of the asset 12. Thus, the training data set 34 provides a representative sample of the signals produced by the asset 12 during all normal modes of operation.

Upon acquiring the training data set 34, the unique training procedure 30 can be implemented in accordance with instant invention.

The unique training procedure 30 is comprised of a calibrate parameter estimator procedure 36 and a calibrate fault detector procedure 38. The calibrate parameter estimator procedure 36 creates the parameter estimation model 52 and trains the parameter estimation model 52 using the training data 34. The calibrate parameter estimator procedure 36 further stores this model as a new parameter estimation model 52 in the process model 50.

The process model 50 may contain one or more parameter estimation models 52 depending upon the requirements of the approach taken by a designer. Continuing to refer to FIG. 3, the training procedure 30 may be, in general, performed using any parameter estimation method suitable for defining a parameter estimation model 52 useful for estimating the values of one or more process signals. Methods suitable for the calibrate parameter estimator procedure 36 include, but are not limited to, a plurality of redundant sensor techniques, a plurality of multivariate state estimation techniques, a plurality of neural network techniques, a plurality of mathematical model techniques, a plurality of autoregressive moving average techniques, and a plurality of Kalman filter techniques. Each parameter estimation model 52 contained in the process model 50 may be created to implement any one of a plurality of parameter estimation techniques. Further, the parameter estimation technique implemented for an individual parameter estimation model 52 is not constrained to be the same as the parameter estimation technique implemented for any other parameter estimation model 52 contained in the process model 50.

One example of the calibrate parameter estimator procedure 36 would be the computation of a bias term between two redundant sensors wherein the parameter estimation model 52 used for estimating the value of one sensor during the surveillance procedure 60 consisted of summing the observed value of a second redundant sensor with a bias term computed during the training procedure 30 as the mean difference between the two sensor values over the training data set 34. More sophisticated examples of the training procedure 30 using multivariate state estimation techniques will be described herein below.

Still referring to FIG. 3, the calibrate fault detector procedure 38 makes use of the parameter estimation models 52 to provide estimated values for at least one signal parameter contained in the training data. Generally, the calibrate fault detector procedure 38 will create a separate and distinct fault detection model 54 for each sensor or data signal of asset 12 to be monitored for the presence of fault conditions during the surveillance procedure 60. As delineated infra, one hallmark of the instant invention is the fault detection model 54 element of the process model 50 for the asset 12 that is derived during the training procedure 30. In particular, the instant invention encompasses a statistical hypothesis test type of fault detection model 54 having novel and unique characteristics and calibration procedures described herein including but not limited to having a probability density function model empirically derived from a numerical analysis of asset operating data.

Continuing to refer to FIG. 3, the training procedure 30 is completed when all training data 34 has been used to calibrate the process model 50. At this point, the process model 50 includes parameter estimation models 52 and fault detection models 54 for each sensor or data signal of asset 12 to be monitored for the presence of fault conditions during the surveillance procedure 60. The process model array 50 is thereafter useful for performing surveillance of the asset 12.

Figure 4:
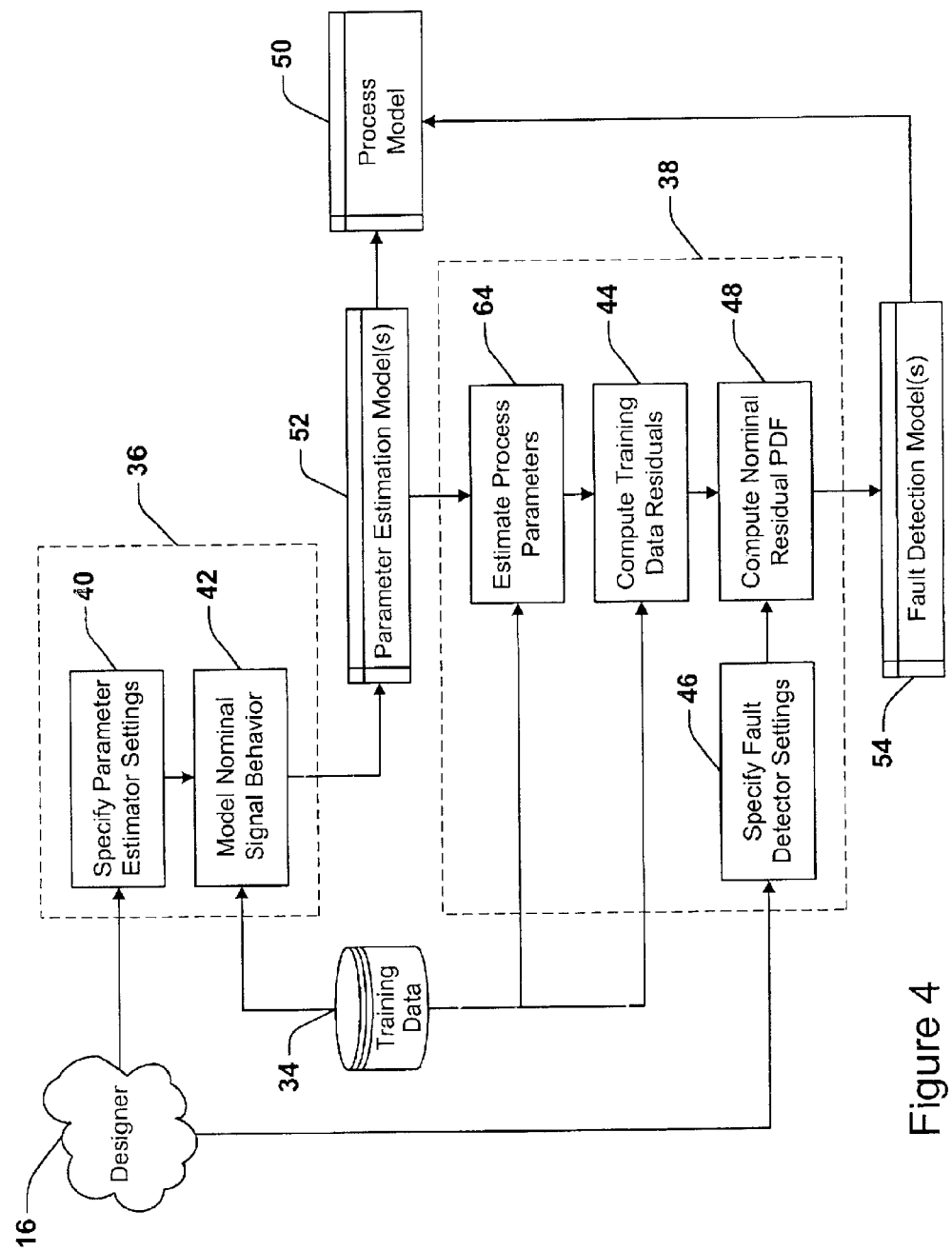
FIG. 4 is a schematic functional flow diagram of a method and system for the fault detection model training procedure in accordance with the instant invention.

Referring to FIG. 4, the training procedure 30 is illustrated in additional detail. A designer 16 initializes the calibrate parameter estimators procedure 36 by specifying a set of parameter estimator methods and settings 40. The parameter estimator methods and settings 40 are then used to operate on the training data 34 via a nominal signal behavior modeling procedure 42, for example using an MSET training procedure as described herein in detail, in order to create the parameter estimation models 52, which are stored in the process model 50.

Still referring to FIG. 4, the training procedure 30 next proceeds to the calibrate fault detectors procedure 38 wherein the parameter estimation models 52 are an input to the procedure. The designer 16 initializes the calibrate fault detectors procedure 38 by specifying a set of fault detector methods and settings 46. Next, the estimate process parameters procedure 64 operates the parameter estimation models 52 over the training data 34 to generate an estimated value for each monitored signal value contained in the training data 34. It is important that the estimate process parameters procedure 64 used in the calibrate fault detectors procedure 38 be the same estimate process parameters procedure 64 that will later be used in the surveillance procedure 60 (reference FIGS. 1 and 2 for surveillance procedure 60). Next, A compute training data residuals procedure 44 calculates the training data residuals for each monitored signal, which are calculated as the difference between the training data value and the corresponding estimated data value for each monitored signal. The training data residuals are next used by a compute nominal residual probability density function (PDF) procedure 48 to create a fault detection model 54 for each monitored signal. In accordance with the instant invention, the fault detection models 54 is typically comprised of mathematical descriptions of the probability density function that best characterizes or best fits the training data residual for the monitored signal. The training data is presumed to accurately characterize the expected normal operating states of the asset 12. Therefore, the training data residuals are characteristic of the expected normal deviations between the observed signal values and the values estimated using the parameter estimation models 52. The fault detection models 54 are stored in the process model 50 thereby completing the training procedure.

One hallmark of the instant invention is the method and system for computing the fault detection models 54 by the means of the compute nominal residual probability density function (PDF) procedure 48. As will be described mathematically herein below, the compute nominal residual probability density function (PDF) procedure 48 fits a general open-ended probability function to the training data residuals and employs this fitted function when implementing a herein named Adaptive Sequential Probability (ASP) method and system for computing the fault detection model 54 and thereafter employing said fault detection model 54 for the purpose of performing a fault detection procedure 66 of the surveillance procedure 60.

Surveillance Procedure

Figure 5:
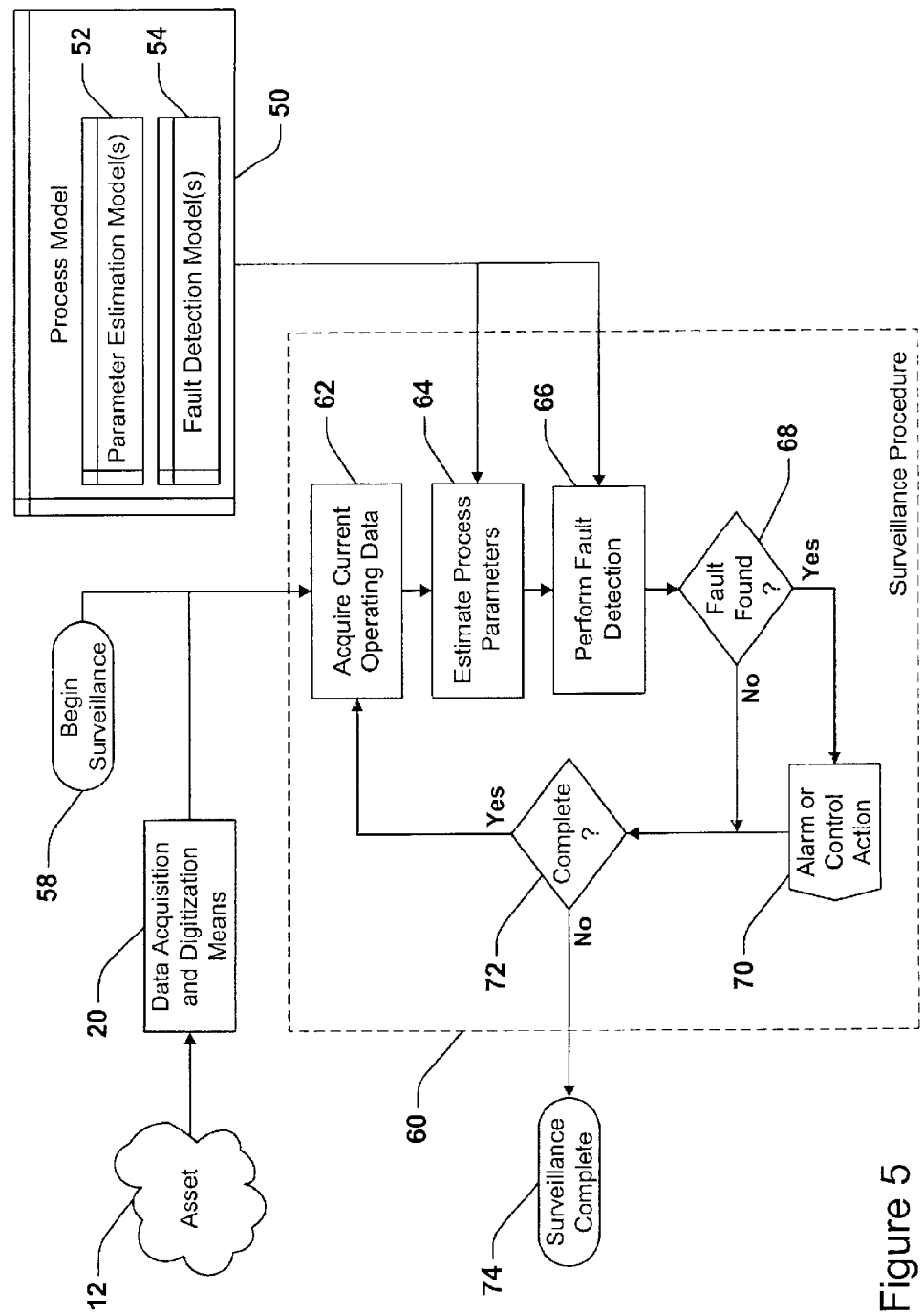
FIG. 5 is a schematic functional flow diagram of a preferred method and system for performing surveillance of an asset using at least one parameter estimation model and at least one fault detection model in accordance with the instant invention.

Referring to FIG. 5, the surveillance procedure 60 is comprised of acquiring successive vectors of current operating data and determining for each such observation vector whether the current operating data is indicative of a fault or failure of the asset 12. The surveillance procedure 60 further includes implementing an alarm or control action 70 for the purpose of notifying an operator and/or taking a corrective action in response to a detected fault or failure of the asset 12. The surveillance procedure 60 is in general an open-ended data acquisition and analysis loop that continues until such time as the operator chooses to terminate the surveillance 74.

More specifically, and referring to FIG. 5, the surveillance procedure 60 begins 58 with an acquire current operating data procedure 62 that employs the data acquisition and digitization means 20 (FIG. 1) to acquire a current set of signal data from the monitored asset 12. The current set of signal data is provided to the estimate process parameters procedure 64 that uses the parameter estimation models 52 to estimate values for one or more of the current signal data values. The observed and estimated data are next provided to a perform fault detection procedure 66 that uses the fault detection models 54 to determine whether a fault is found 68 in the current operating data. If a fault is found 68 is true, an alarm and/or control action 70 is taken. Upon completing the fault found procedure 68, the surveillance procedure 60 then repeats for the next available set of signal data for as long as a surveillance complete decision procedure 72 determines that additional surveillance data are available or terminates at surveillance complete step 74 when no more surveillance data are available or when terminated by an operator.

Figure 6:
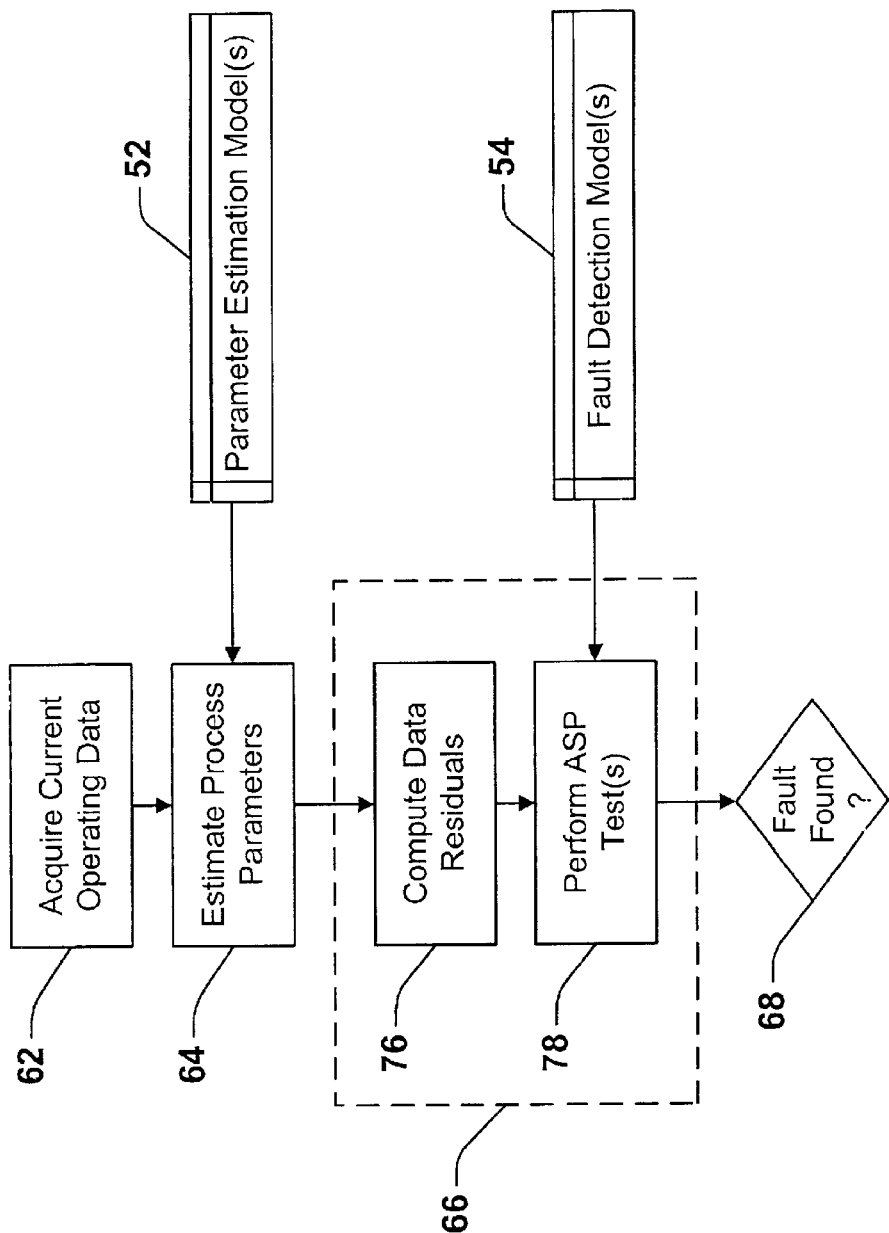
FIG. 6 is a schematic functional flow diagram of a method and system for the fault detection surveillance procedure in accordance with the instant invention.

Referring now to FIG. 6, the perform fault detection procedure 66 of surveillance procedure 60 is illustrated in additional detail. For each current set of signal data values acquired the estimate process parameters procedure 64 uses the parameter estimation models 52 to estimate values for one or more of the current signal data values. The compute data residuals procedure 76 performs a mathematical transformation on the acquired and estimated values to produce a current set of residual data values. Said mathematical transformation is most typically a simple mathematical difference, however, any appropriate transformation may be used including transformations that remove correlated and uncorrelated noise from the residual data values. The residuals produced and transformed in the compute data residuals procedure 76 are next processed by a perform ASP tests procedure 78 that uses the fault detection models 54 to produce a ASP fault indication that is a hallmark of the method and system of the instant invention. Next, the fault found decision procedure 68 is performed on the basis of the ASP fault indication results produced by the perform ASP tests procedure 78. The fault found decision procedure 68 may have any one of a plurality of structures and procedures, including but not limited to methods and systems to perform false alarm filtering by means of observing a time series of ASP fault indication results for the purposes of determining the actual presence of a fault. In one preferred embodiment of the instant invention, a conditional probability fault found decision procedure 68 is used to perform said false alarm filtering.

Continuing to refer to FIG. 6, the estimate process parameters procedure 64 uses the parameter estimation models 52 to estimate values for one or more of the current signal data values wherein the parameter estimation method used may have any one of a plurality of structures and procedures, including but not limited to, a plurality of redundant sensor techniques, a plurality of multivariate state estimation techniques, a plurality of neural network techniques, a plurality of mathematical model techniques, a plurality of autoregressive moving average techniques, and a plurality of Kalman filter techniques.

Figure 7:
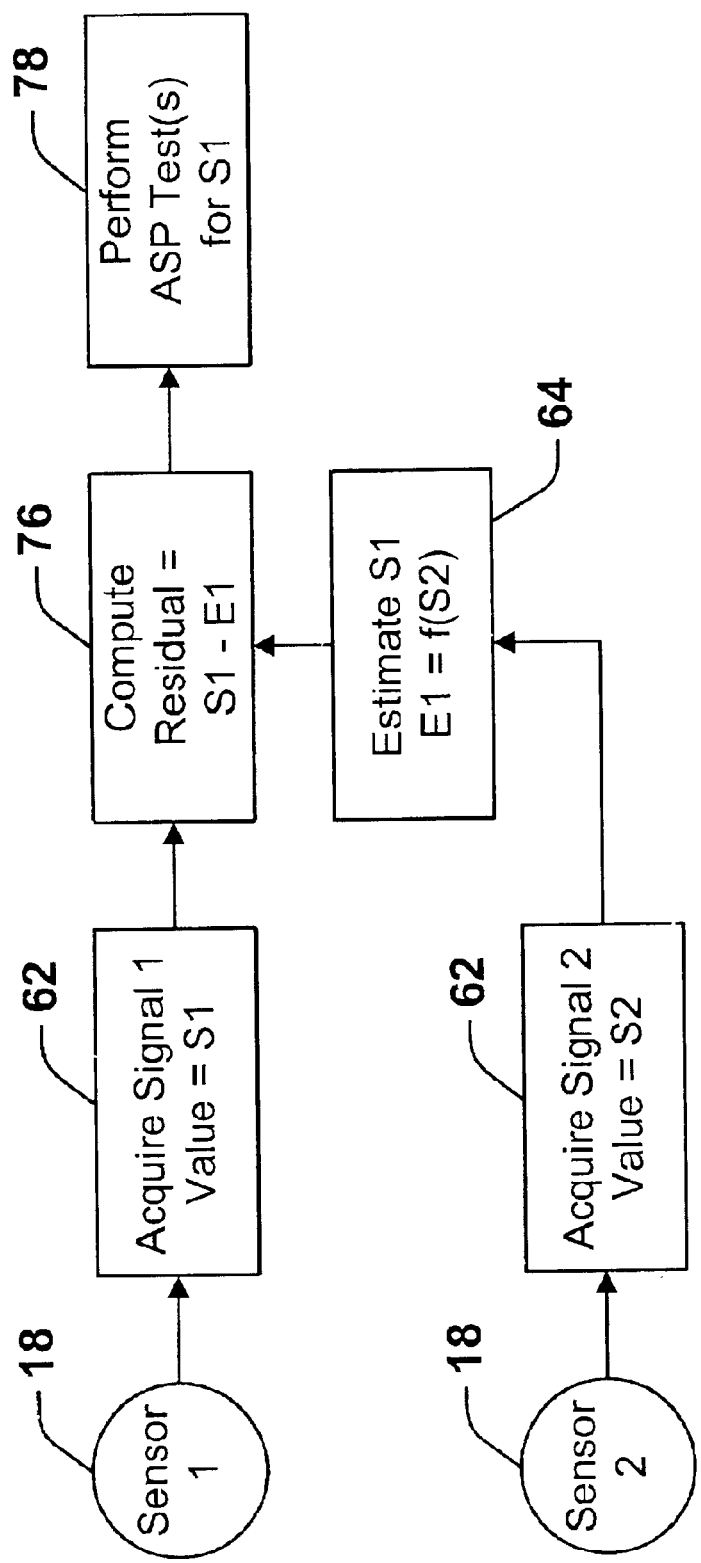
FIG. 7 is a schematic functional flow diagram of a method and system for performing parameter estimation and fault detection using a redundant sensor.

Referring to FIG. 7, one possible redundant sensor technique for the estimate process parameters procedure 64 is illustrated. The acquire current operating data procedure 62 is used to acquire current signal data values from signals 14 monitored from asset 12 via sensors 18. The estimated value for a first redundant sensor signal is computed using a mathematical transformation on the acquired value of a second redundant sensor signal. Said mathematical transformation is the estimate process parameters procedure 64 that in this case may be a simple equivalence or may include biasing, de-noising or other signal processing. The compute data residuals procedure 76 is then performed followed by the perform ASP tests procedure 78 as described hereinabove and further delineated hereinbelow.

Figure 8:
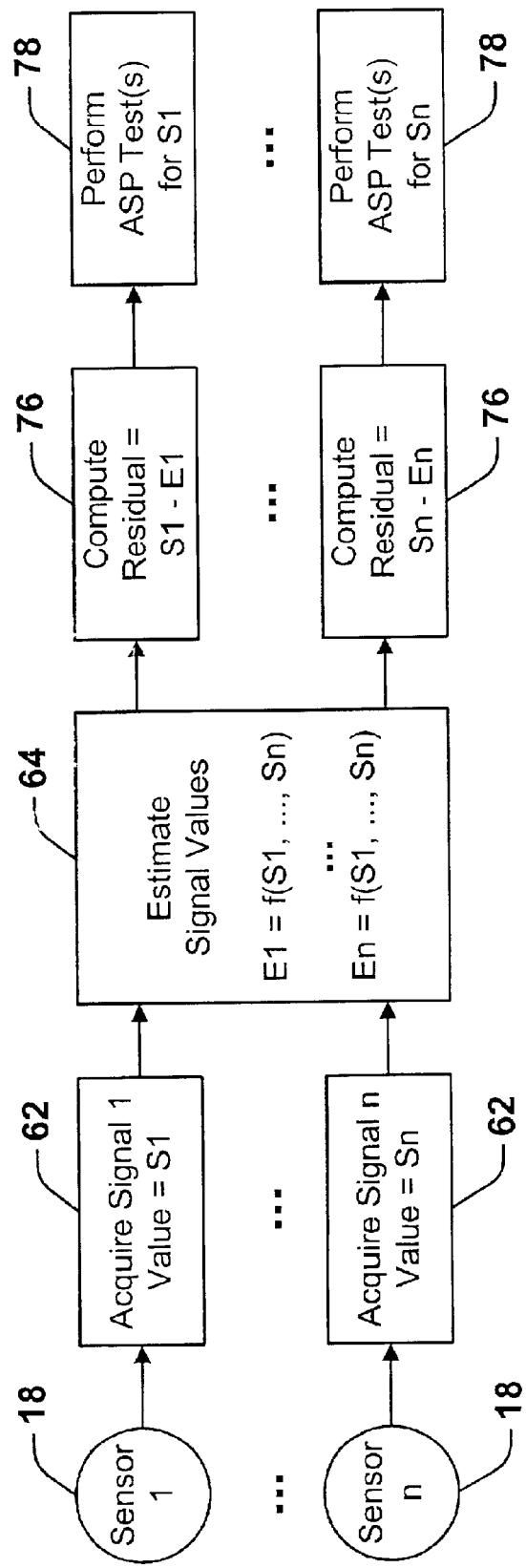
FIG. 8 is a schematic functional flow diagram of a method and system for performing parameter estimation and fault detection using a generalized parameter estimation model, such as a multivariate state estimation model, a neural network model, an analytical model, or a Kalman filter model.

Referring to FIG. 8, one possible multivariable parameter estimation technique for the estimate process parameters procedure 64 is illustrated. The acquire current operating data procedure 62 is used to acquire current signal data values from signals 14 monitored from asset 12 via sensors 18. The estimated value for one or more sensor signals is computed using a mathematical transformation on the acquired values of one or more sensor signals. Said mathematical transformation is the estimate process parameters procedure 64 that in this case may implement any feasible parameter estimation technique or procedure, including but not limited to a plurality of multivariate state estimation techniques, a plurality of neural network techniques, a plurality of mathematical model techniques, and a plurality of Kalman filter techniques. The compute data residuals procedure 76 is then performed followed by the perform ASP tests procedure 78 as described hereinabove and further delineated hereinbelow.

Referring again to FIG. 6, the usefulness of the instant invention is, inter alia, the improvement achieved in the accuracy of the fault decision procedure 68 that results from the improvement achieved in the accuracy of perform fault detection procedure 66 made possible by the novel perform ASP tests procedure 78 that is a hallmark of the instant invention. Improving the accuracy of the fault decision procedure 68 accomplishes a reduction in the number of false alarms sent to a process operator or control system that can in turn result in an erroneous alarm or control action by the alarm or control action procedure 70. Further, improving the accuracy of the fault decision procedure 68 accomplishes a reduction in the number of missed alarms thereby accomplishing more timely alarm or control action by the alarm or control action procedure 70. The instant invention thereby enables improved operating safety, improved efficiency and performance, and reduced maintenance costs for a wide variety of industrial, utility, business, medical, transportation, financial, and biological processes and apparatuses wherein such process and/or apparatus asset 12 has at least one characteristic data signal suitable for surveillance.

Figure 9:
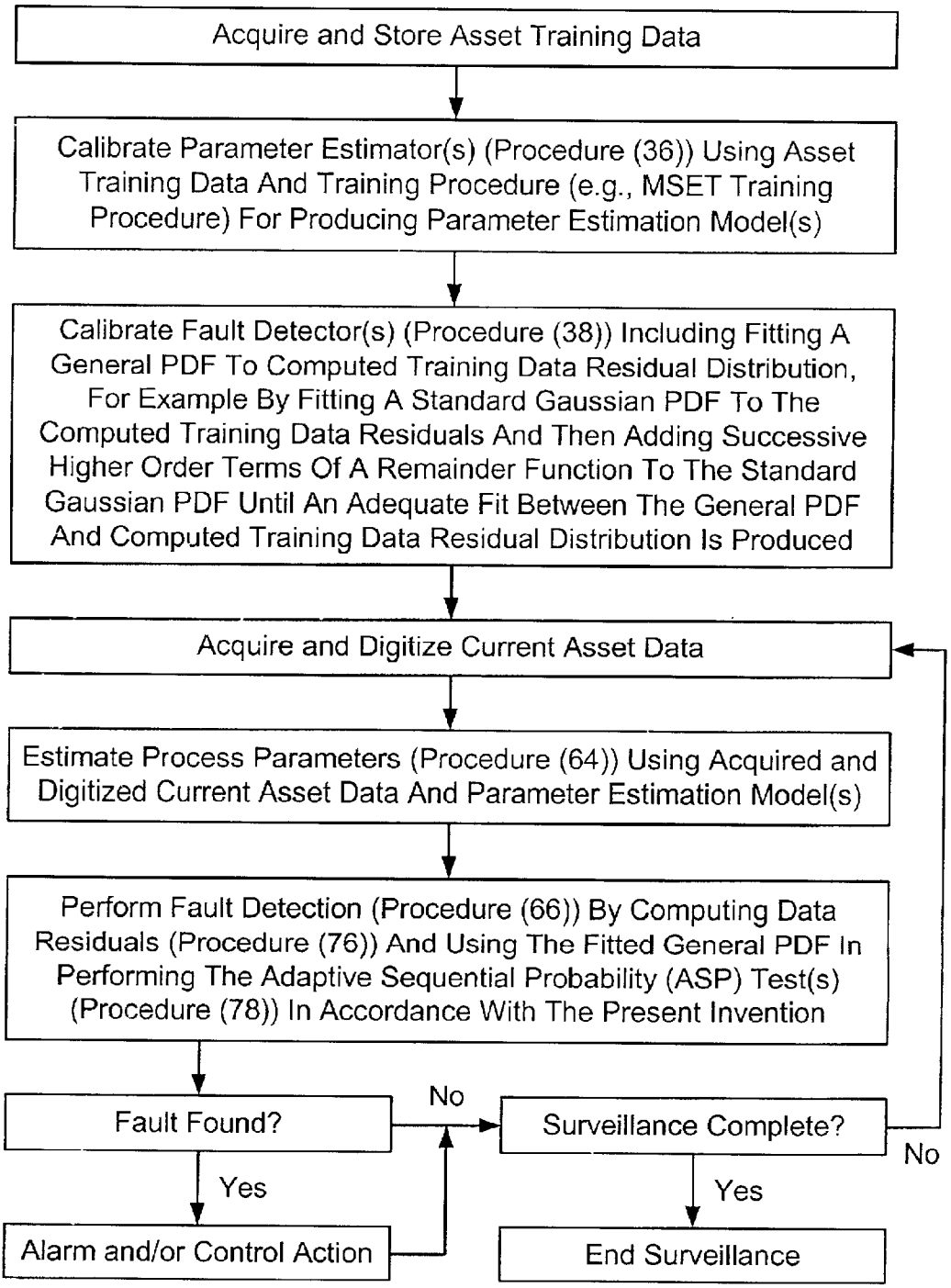
FIG. 9 is a flow diagram of a training and surveillance procedure in accordance with the instant invention.

In use and operation, and in one preferred form, FIGS. 1 and 9 outline a general surveillance procedure of the system 10 when employing the novel fault detection model 54 contained in the process model 50 and the accompanying novel fault detection procedure 66 having the perform ASP tests procedure 78. In a typical surveillance procedure, the asset 12 is the source of at least one process signal 14 that is acquired and digitized using conventional data acquisition means 20 for providing the data acquisition procedure for the purpose of computer-assisted surveillance. The digitized signal data is generally evaluated using a computer 22 having computer software modules implementing the estimate process parameters procedure 64, and the perform fault detection procedure 66. The estimate process parameters procedure 64 is used to produce an estimated signal value for at least one process signal 14 emanating from the asset 12. The estimate process parameters procedure 64 in general makes use of the process model 50 stored in a memory means 24 associated with the computer 22 to produce the estimated signal values. The estimated signal values are then generally evaluated using the perform fault detection procedure 66 to identify faults or operating anomalies in the asset 12. The results of the fault detection evaluation are thereafter communicated by a conventional communications means 26 (as is known to those having ordinary skill in the art, and informed by the present disclosure) to an operator console 80 and/or automated process control system 82 for possible alarm and/or control action.

The computer 22 along with the associated memory means 24 can also be employed to perform the training and surveillance procedures 30, 60 as delineated hereinabove and to produce and store all the data associated with these procedures, for example, the historical training data, designer defined settings, and the process model.

Multivariate State Estimation Technique (MSET) for Estimate Process Parameters Procedure In one preferred embodiment of the instant invention, the estimate process parameters procedure 64 uses a multivariate state estimation technique (MSET) procedure having an MSET parameter estimation model 52 structure. The US Department of Energy's Argonne National Laboratory originally developed the implementation of MSET described herein for surveillance of sensors and components in nuclear power plant applications. However, other implementations of a multivariate state estimation technique are possible and useful in conjunction with the instant invention. MSET is in general a statistically derived parameter estimation algorithm that uses advanced pattern recognition techniques to measure the similarity or overlap between signals within a defined domain of asset operation (set of asset operating states). MSET "learns" patterns among the signals by numerical analysis of historical asset operating data. These learned patterns or relationships among the signals are then used to identify the learned state that most closely corresponds with a new signal data observation. By quantifying the relationship between the current and learned states, MSET estimates the current expected response of the asset signals. MSET then uses threshold comparisons or a form of statistical hypothesis testing, such as a Sequential Probability Ratio Test (SPRT) as disclosed in U.S. Pat. No. 5,459,675 which is hereby incorporated by reference in its entirety or the Adaptive Sequential Probability (ASP) procedure that is a hallmark of the instant invention to compare the current estimated value of a signal with its observed value. The MSET procedure provides an accurate and widely applicable method to estimate the operating signal values for an asset. However, other implementations of the parameter estimation procedure are possible and useful in conjunction with the instant invention.

An MSET model is created for the asset 12 using the MSET training algorithms to learn the inherent data relationships within a set of historical asset operating data. The trained MSET model is then used with the MSET parameter estimation and fault detection algorithms to perform the process surveillance function when presented with a new observation of signal data values. The following sections will first provide a mathematical overview of the MSET algorithms and procedures useful for training a parameter estimation model and for using this trained model for process surveillance. The description is followed by a detailed description of a preferred embodiment of the instant invention using a novel Adaptive Sequential Probability (ASP) procedure for fault detection during process surveillance.

MSET Training and Parameter Estimation Procedures

The MSET methods are generally described in the following two US Government documents produced and maintained by the US Department of Energy's Argonne National Laboratory, Argonne, Ill., disclosure of which is incorporated in its entirety herein by reference.

J. P. Herzog, S. W. Wegerich, R. M. Singer, and K. C. Gross, "Theoretical Basis of the Multivariate State Estimation Technique (MSET)," Argonne National Laboratory, ANL-NT-49, December 1997.

J. P. Herzog, S. W. Wegerich, K. C. Gross, and R. M. Singer, "MSET: Code Structure and Interface Development Guide," ANL-NT-48, August 1997.

The MSET algorithm uses pattern recognition with historical operating data from an asset to generate a parameter estimation model. If data is collected from a process over a range of operating states, this data can be arranged in matrix form, where each column vector (a total of m) in the matrix represents the measurements made at a particular state. Thus, this matrix will have the number of columns equal to the number of states at which observations were made and the number of rows equal to the number of measurements (a total of n signal data values) that were available at each observation. We begin by defining the set of measurements taken at a given time $t_j$ as an observation vector $X(t_j)$, $$\vec{X}(t_j) = [x_1(t_j), x_2(t_j), \ldots, x_n(t_j)]^T \tag{E1}$$

where $x_i(t_j)$ is the measurement from signal i at time $t_j$. We then define the data collection matrix as the process memory matrix D:

$$\vec{D} = \begin{bmatrix} d_{1,1} & d_{1,2} & \ldots & d_{1,m} \\ d_{2,1} & d_{2,2} & \ldots & d_{2,m} \\ & \vdots & & \\ d_{n,1} & d_{n,2} & \ldots & d_{n,m} \end{bmatrix} \equiv [\vec{X}(t_1), \vec{X}(t_2), \ldots, \vec{X}(t_m)] \tag{E2}$$

Each of the column vectors ($X(t_j)$) in the process memory matrix represents an operating state of the asset. Any number of observation vectors can be assigned to the process memory matrix. Training an MSET model includes collecting enough unique observation vectors from historical operation of the asset during normal conditions such that the process memory matrix encompasses the full dynamic operating range of the asset. Computation of the D matrix is the first of three steps in the method for training an MSET model based on historical operating data.

One of at least two algorithms is used by MSET to select the vectors in the D matrix. The MinMax algorithm extracts vectors that bound the vector space defined by the training data and returns the smallest process memory matrix that will produce an effective system model (see also U.S. Pat. No. 5,764,509 which is hereby incorporated by reference in its entirety). A vector ordering algorithm selects and includes representative vectors from the inner regions of the vector space producing a more accurate system model.

Once the process memory matrix has been constructed, MSET is used to model the dynamic behavior of the system. For each current observation of the system (Xobs), MSET compares the observation vector to the stored operating states to calculate an estimate of the process parameter values. The parameter estimate of the current process state (Xest) is an n-element vector that is given by the product of the process memory matrix and a weight vector, W:

$$\vec{X}_{est} = \vec{D} \cdot \vec{W} \tag{E3}$$

The weight vector represents a measure of similarity between the estimate of the current state and the process memory matrix. To obtain the weight vector, we minimize the error vector, R, where:

$$\vec{R} = \vec{X}_{obs} - \vec{X}_{est} \quad (E4)$$

The error is minimized for a given state when:

$$\vec{W} = (\vec{D}^T \otimes \neg)^{-1} \cdot (\vec{D} \otimes \vec{X}_{obs}) \quad (E5)$$

This equation represents a "least squares" minimization when the pattern recognition operator $\otimes$ is the matrix dot product. Several advanced pattern recognition operators have been defined that provide excellent parameter estimation performance. Pattern recognition operators used by MSET include, but are not limited to, the System State Analyzer (SSA) method (see also U.S. Pat. No. 4,937,763 which is hereby incorporated by reference in its entirety), the Bounded Angle Ratio Test (BART) method (see also U.S. Pat. No. 5,987,399 which is hereby incorporated by reference in its entirety), the Vector Pattern Recognizer (VPR) method, the Vector Similarity Evaluation Technique (VSET) method, and the Probabilistic State Estimation Method (PSEM).

Once the weight vector is found, the resulting current state estimate of the system (i.e., the parameter estimate vector) is given by;

$$\vec{X}_{est} = \vec{D} \cdot (\vec{D} \otimes \neg)^{-1} \cdot (\vec{D} \otimes \vec{X}_{obs}) \quad (E6)$$

The first application of the pattern recognition operator in equation E6 ($D^T \otimes D$) involves a comparison between the row vectors in the $D^T$ matrix and each of the column vectors in the D matrix. If we define $G = D^T \otimes D$, then G, the similarity matrix, is an m by m matrix. The element in the i-th row and j-th column of the matrix ($g_{i,j}$) represents a measure of the similarity between the i-th and j-th column vectors (i.e., memorized states) in the process memory matrix. The second application of the pattern recognition operator in equation E6 ($D^T \otimes X_{obs}$) involves a comparison between the row vectors in the $D^T$ matrix and each of the elements in the observation vector Xobs. If we define $A = D^T \otimes X_{obs}$, then A, the similarity vector, is an m by 1 vector. Each element in the similarity vector is a measure of the similarity between the observation vector and the i-th column vector (i.e., memorized state) in the process memory matrix.

Note that the similarity matrix is a function of the process memory matrix only. Thus, the similarity matrix and its inverse $Ginv = (D^T \otimes D)^{-1}$ can be calculated as soon as the process memory matrix has been derived thereby making the application of MSET to an on-line surveillance system more computationally efficient. Computation of the Ginv matrix initializes the parameter estimation model and completes the second of three steps in the procedure for training an MSET model based on historical operating data.

The third and final step in the MSET training procedure includes analyzing the historical training data using equation E4 to produce a residual error vector, R, for each observation vector in the training data. The collection of residual error vectors comprises the training data residuals necessary for training the fault detection model 54 using any one of a plurality of techniques, including but not limited to the SPRT technique, and the novel ASP technique that is a hallmark of the instant invention.

The Sequential Probability Ratio Test (SPRT) technique is a statistical hypothesis test fault detection algorithm historically used for MSET process surveillance. The SPRT technique is described in U.S. Pat. No. 5,459,675, which is incorporated herein by reference in its entirety. The SPRT analyzes a sequence of discrete residual error values from a signal to determine whether the sequence is consistent with normal signal behavior or with some other abnormal behavior. When the SPRT reaches a decision about the current signal behavior, e.g., that the signal is behaving normally or abnormally, the decision is reported and the test continues analyzing the signal data. For any SPRT, signal behavior is defined to be normal when the signal data adheres to a Gaussian probability density function (PDF) with mean 0 and variance $\sigma^2$. Normal signal behavior is referred to as the null hypothesis, $H_0$. MSET employs four specific SPRT hypothesis tests. Each test determines whether current signal behavior is consistent with the null hypothesis or one of four alternative hypotheses. The four tests are known as the positive mean test, the negative mean test, the nominal variance test, and the inverse variance test. For the positive mean test, the corresponding alternative hypothesis, $H_1$, is that the signal data adhere to a Gaussian PDF with mean +M and variance $\sigma_2$. For the negative mean test, the corresponding alternative hypothesis, $H_2$, is that the signal data adheres to a Gaussian PDF with mean −M and variance $\sigma^2$. For the nominal variance test, the corresponding alternative hypothesis, $H_3$, is that the signal data adheres to a Gaussian PDF with mean 0 and variance $V\sigma^2$. For the inverse variance test, the corresponding alternative hypothesis, $H_4$, is that the signal data adheres to a Gaussian PDF with mean 0 and variance $\sigma^2/V$. The user-assigned constants M and V control the sensitivity of the tests.

Limitations of the SPRT Fault Detector Training and Surveillance Method and System One significant shortcoming of the SPRT technique is found in the assumptions underlying its mathematical formulation. Specifically, the SPRT technique presumes that the residual error signals adhere to a Gaussian probability density function. For residual error signals that are non-Gaussian, the fault detector false alarm rates and/or missed alarm rates specified by the designer are not accomplished by the SPRT procedure thereby degrading the fault decision accuracy of the asset control and/or surveillance system. The novel ASP technique of the instant invention specifically removes the assumption that the residual error signals adhere to a Gaussian probability density function. The ASP technique implements any one of a plurality of methods to numerically fit a probability density function to the observed residual error signal distribution that is characteristic of normal asset operation. The derived probability density function is then used to perform a dynamic statistical hypothesis test thereby achieving the fault detector false alarm and missed alarm rates specified by the designer and improving the fault decision accuracy of the asset control and/or surveillance system.

Fault Detection Using Statistical Hypothesis Test Procedures

The general theory underlying the statistical hypothesis test will now be delineated below. Next, the SPRT implementation of a dynamic statistical hypothesis test will be described. Finally, the novel ASP implementation of a dynamic statistical hypothesis test for non-Gaussian residual error signals will be delineated in detail along with a delineation of its reduction to practice.

Bayes' Rule for a Single Observation

Statistical decision problems in which there are just two possible outcomes constitute an important class called binary hypothesis testing problems. The possible states of a system are called hypotheses and each individual state of the system is termed a simple hypothesis. A simple hypothesis is a complete specification of a probability distribution for the system (i.e., the distribution of possible observations or samples from the system). The "hypothesis" being tested is that the particular distribution is the correct one.

The basic operation in a binary hypothesis test is to evaluate the veracity of a hypothesis, H, given a piece of evidence or observation, e, from the system being studied. Because of the unpredictability or element of chance inherent in the system, the test deals with the probabilities that events occur or that hypotheses are true. The probability that a hypothesis is true given a piece of evidence is written as P(H|e). The notation identifies a conditional probability—namely the probability that the hypothesis is true under the condition that the event has occurred with absolute certainty. Bayes' well known inversion rule, as described in Probabilistic Reasoning in Intelligent Systems: Networks of Plausible Inference, by Judea Pearl, Morgan Kaufmann Publishers, Inc., San Mateo, Calif., 1988, Second Edition at pages 29 through 39, provides a means for evaluating the conditional probability of a hypothesis, P(H|e), which is also known as the posterior probability, $$P(H|e) = \frac{P(e|H)P(H)}{P(e)}. \tag{E7}$$

P(e|H) is the probability that the observation would occur if the hypothesis is true. P(H) is the probability that the hypothesis is true before any observations of the system have been made, also known as the prior probability. The denominator, P(e), is the unconditional probability that the observation occurs.

Basic axioms of set theory can be used to prove the following identity for two events R and S: R=(R∩S)∪(R∩¬S), where ¬S is the converse of event S. In probability theory, the analog of this identity is $$P(R)=P(R, S)+P(R, \neg S), \tag{E8}$$

where the notation P(R,S) is used represent the probability of the joint event R∩S. The multiplication law states that the probability of two events occurring jointly can be expressed as a function of the conditional probability of one event based on the other, $$P(R, S)=P(R|S)P(R). \tag{E9}$$

If R and S are independent events, then P(R|S)=P(R) and the multiplication law simplifies to P(R, S)=P(R) P(S).

Bayes' rule can be simplified by eliminating the denominator in equation E7. Combining equations E8 and E9, and substituting e for R and H for S, the denominator can be written as $$P(e)=P(e|H)P(H)+P(e|\neg H)P(\neg H). \tag{E10}$$

Therefore, Bayes' rule becomes $$P(H|e) = \frac{P(e|H)P(H)}{P(e|H)P(H) + P(e|\neg H)P(\neg H)}. \tag{E11}$$

The power of Bayesian techniques comes primarily from the fact that in causal reasoning the relationship P(e|H) is local, namely, given that H is true, the probability of e can be estimated naturally and is not dependent on many other propositions. For instance, given that the measurements from an experiment adhere to a particular PDF, the probability that any single measurement will occur is easily computed The complementary form of Bayes' rule provides the posterior probability for the converse of the hypothesis. It is evaluated by substituting ¬H for each instance of H in equation E11 and noting that ¬(¬H)=H:

$$P(\neg H|e) = \frac{P(e|\neg H)P(\neg H)}{P(e|H)P(H) + P(e|\neg H)P(\neg H)}. \tag{E12}$$

An alternate form of Bayes' rule is produced by dividing it (i.e., equation E11) with its complementary form (i.e., equation E12) to obtain $$\frac{P(H|e)}{P(\neg H|e)} = \frac{P(e|H)}{P(e|\neg H)} \frac{P(H)}{P(\neg H)}. \tag{E13}$$

This form of Bayes' rule is further manipulated by first defining the prior odds on hypothesis H as $$O(H) = \frac{P(H)}{P(\neg H)}, \tag{E14}$$

the likelihood ratio as $$L(e|H) = \frac{P(e|H)}{P(e|\neg H)}, \tag{E15}$$

and the posterior odds on H as $$O(H|e) = \frac{P(H|e)}{P(\neg H|e)}. \tag{E16}$$

Bayes' rule then specifies the posterior odds as the product of the likelihood ratio and the prior odds, $$O(H|e)=L(e|H)O(H). \tag{E17}$$

Baves' Rule for a Time Series

The formulation above specifies Bayes' rule for a single observation and a binary hypothesis. For the application of binary hypothesis tests to real world signals, the formulation must be able to handle a sequence of discrete observations. This is accomplished by beginning with a single observation and successively updating Bayes' rule for each successive observation. Let the sequence $\{Y_n\}$ be an ordered set of n elements, $\{Y_n\}=y_1, y_2, \ldots, y_n$, in which the elements are observations of the signal made at n discrete moments in time such that $t_1<t_2< \ldots <t_n$. Bayes' rule for the first observation ($y_1$) in the time series is $$P(H|y_1) = \frac{P(y_1|H)P(H)}{P(y_1)}. \tag{E18}$$

Adding the second observation from the time series, Bayes' rule for the joint event $y_1 \cap y_2$ is $$P(H|y_1, y_2) = \frac{P(y_1, y_2|H)P(H)}{P(y_1, y_2)}. \tag{E19}$$

With the aid of the multiplication law (equation E9), the joint event probabilities are converted to conditional probabilities so that the right hand side of this equation can be rewritten as $$P(H|y_1, y_2) = \frac{P(y_2|y_1, H)P(y_1|H)P(H)}{P(y_2|y_1)P(y_1)}. \quad (E20)$$

Note that the probability of the joint event $y_1 \cap y_2$ is written as $P(y_1, y_2) = P(y_2|y_1) P(y_1)$ instead of the equivalent $P(y_1, y_2) = P(y_1, y_2) P(y_2)$ because of the temporal dependency of the data. The second form of the multiplication law reduces to $P(y_1, y_2) = P(y_1) P(y_2)$ because earlier events (e.g., $y_1$) in a time series cannot be dependent on later events (e.g., $y_2$).

The multiplication law is used for each successive observation in the time series to derive the form of Bayes' rule for the joint event $(y_1 \cap y_2 \cap \ldots \cap y_n)$:

$$P(H|y_1, y_2, \ldots, y_n) = \quad (E21)$$
$$\frac{P(y_n|y_{n-1}, \ldots, y_1, H) \ldots P(y_2|y_1, H)P(y_1|H)P(H)}{P(y_n|y_{n-1}, \ldots, y_1) \ldots P(y_2|y_1)P(y_1)}.$$

Since the probabilities for each of the later observations in the time series are conditioned on earlier observations, Bayes' rule is difficult to solve in the general case. But if the observations in the series are independent of each other (i.e., random), then the probabilities will be dependent on the hypothesis only. In this case the conditional probability for the ith observation, $P(y_i|y_{i-1}, \ldots, y_1, H)$, is simply $P(y_i|H)$. Thus, Bayes' rule for independent observations in a time series is $$P(H|y_1, y_2, \ldots, y_n) = \quad (E22)$$
$$\frac{P(y_n|H) \ldots P(y_1|H)P(H)}{P(y_n) \ldots P(y_1)} = P(H) \prod_{i=1}^{n} \frac{P(y_1|H)}{P(y_1)}.$$

If an explicit time dependency can be established for the observations in the time series (i.e., a function is found that relates earlier events to later events), then the general form of Bayes' rule (equation E21) can be used to develop failure detection models for serially-correlated signals. However, the residual signals formed by the difference between the observed and estimated signal values are in general random signals; thus, Bayes' rule for random time series is used as the basis for the fault detection models.

Dividing by the complementary form of Bayes' rule for random time series and utilizing the definition of the posterior odds, prior odds, and likelihood ratio from above, an alternate form of Bayes' rule for a time series is developed:

$$O(H|y_1, y_2, \ldots, y_n) = O(H) \prod_{i=1}^{n} L(y_1|H). \quad (E23)$$

If we take the logarithm of this equation, the incremental nature of Bayesian formulation becomes more apparent. Equation E24 shows the log of the likelihood ratio as a weight, carried by each observation in the sequence, which additively sways the belief in the hypothesis one way or the other.

$$\ln[O(H|y_1, y_2, \ldots, y_n)] = \ln[O(H)] + \sum_{i=1}^{n} \ln[L(y_1|H)]. \quad (E24)$$

Sequential Hypothesis Tests

Wald first presented and studied the following sequential test of a simple hypothesis against a simple alternative, as described in Sequential Analysis, by A. Wald, John Wiley and Sons, Inc., New York, 1947. Let $H_0$ be a specific probability density function called the null hypothesis. Then the probability that the time series $\{Y_n\}$ contains samples drawn from $H_0$ is $P(y_1, y_2, \ldots, y_n|H_0)$. Let $H_j$ be a different probability density function called the alternative hypothesis. Then the probability that the time series $\{Y_n\}$ contains samples drawn from $H_j$ is $P(y_1, y_2, \ldots, y_n|H_j)$. Two threshold limits A and B are chosen, with A<B, and after each observation in the series the following statistic ($\Lambda_{j,n}$) is calculated:

$$\Lambda_{j,n} = \frac{P(y_1, y_2, \ldots, y_n|H_j)}{P(y_1, y_2, \ldots, y_n|H_0)}. \quad (E25)$$

The test procedure is then as follows. If the statistic is greater than or equal to the upper threshold limit (i.e., $\Lambda_{j,n} \geq B$), then a decision is made to accept hypothesis $H_j$ as true. If the statistic is less than or equal to the lower threshold limit (i.e., $\Lambda_{j,n} \leq A$), then a decision is made to accept hypothesis $H_0$ as true. If the statistic falls between the two limits (i.e., $A<\Lambda_{j,n}<B$), then neither hypothesis can yet be accepted to be true and sampling continues. If the observations in the series are independent random variables, then the test statistic reduces to a product of conditional probabilities:

$$\Lambda_{j,n} = \sum_{i=1}^{n} \frac{P(y_i|H_j)}{P(y_i|H_0)}. \quad (E26)$$

In the sequential hypothesis tests, the logarithm of the test statistic is often easier to work with:

$$\ln \Lambda_{j,n} = \sum_{i=1}^{n} \ln\left[\frac{P(y_i|H_j)}{P(y_i|H_0)}\right]. \quad (E27)$$

The sequential hypothesis test consists of calculating the logarithm of the test statistic for each observation in the series and comparing the result to the logarithms of the lower and upper threshold limits.

The statistic in the sequential hypothesis test is a product of a sequence of likelihood ratios. Each term in the product is the ratio of a probability conditioned on one hypothesis to a probability conditioned on a second hypothesis. The difference between the likelihood ratios in the sequential hypothesis tests and those in Bayes' rule (see equations E15 and E23), is that in Bayes' rule the probabilities are conditioned on a hypothesis and its converse, whereas in the sequential hypothesis tests the probabilities are conditioned on two hypotheses from a set of related hypotheses. In principle, the two hypotheses in the sequential hypothesis tests could be the converse of each other (i.e., the set contains two elements), but in practice the hypotheses are selected from an infinite set of exhaustive and mutually exclusive hypotheses. For instance, suppose the null hypothesis is a Gaussian PDF with a mean of 1 and a variance 10. Then a sequential hypothesis test can be defined in which the alternate hypothesis is any Gaussian PDF in which the mean is not 1 and/or the variance is not 10.

It is informative to compare the sequential hypothesis tests to Bayes' rule for a time series. Given a null hypothesis $H_0$ and an alternative hypothesis $H_j$, the likelihood ratio for an observation e conditioned on the two hypotheses is defined as $$L_j(e|H_0) = \frac{P(e|H_j)}{P(e|H_0)}. \tag{E28}$$

The subscripts emphasize the fact that the two hypotheses are selected from an infinite set of related hypotheses. The prior odds for the two hypotheses are defined as $$O_j(H_0) = \frac{P(H_j)}{P(H_0)}, \tag{E29}$$

while the posterior odds are defined as $$O_j(H_0|e) = \frac{P(H_j|e)}{P(H_0|e)}. \tag{E30}$$

Assuming the observations in the time series are independent, then Bayes' rule conditioned on hypothesis $H_j$ (i.e., equation E22 with the symbol H replaced by $H_j$) can be divided by Bayes' rule conditioned on hypothesis $H_0$ to produce Bayes' rule for a sequential hypothesis test:

$$O_j(H_0|y_1, y_2, \ldots, y_n) = O_j(H_0) \prod_{i=1}^{n} L_j(y_i|H_0). \tag{E31}$$

Dividing this equation through by the prior odds, it becomes apparent that the statistic in the sequential hypothesis test is just the ratio of the posterior odds to the prior odds:

$$\frac{O_j(H_0|y_1, y_2, \ldots, y_n)}{O_j(H_0)} = \prod_{i=1}^{n} L_j(y_i|H_0) \equiv \Lambda_{j,n}. \tag{E32}$$

The prior odds are the ratio of the probability that the alternative hypothesis is true to the probability that the null hypothesis is true, before any data have been collected from the system. In many cases, these probabilities are not known—no prior information about the system is known. In the absence of prior information about the system, these probabilities are taken to be ½, making the prior odds equal to 1. Thus in the absence of prior information, the test statistic $\Lambda_{j,n}$ is equal to the odds that the system adheres to the alternative PDF as opposed to the null PDF.

Error Probabilities for the Sequential Hypothesis Tests

Because the sequential hypothesis tests make decisions based on probabilities, there is always a finite probability that a decision reached by the test is erroneous. If a sequential hypothesis test makes a decision to accept the alternative hypothesis $H_j$ as true when the null hypothesis $H_0$ is true, then an error of type I is said to have occurred. If a sequential hypothesis test makes a decision to accept the null hypothesis $H_0$ as true when the alternative hypothesis $H_j$ is true, then an error of type II is said to have occurred. Although the designation is arbitrary, it stems from situations in which one kind of error is more serious than the other. Since the normal usage of the sequential hypothesis tests is to detect a change in signal response from its normal behavior (i.e., hypothesis $H_0$) to some abnormal behavior (i.e., hypothesis $H_j$), the error of accepting $H_j$ when $H_0$ is true is the more serious error. The probability that a decision to accept hypothesis $H_j$ is erroneous is denoted by $\alpha$. A type I decision error is also called a false alarm and the probability of a type I error is called the false alarm probability. The probability that a decision to accept hypothesis $H_0$ is erroneous is denoted by $\beta$. A type II decision error is also called a missed alarm and the probability of a type II error is called the missed alarm probability.

The sequential hypothesis tests are open-ended. The tests will continue to collect observations from the system and update the test statistic until the test statistic satisfies one of the two decision conditions. In principle, the number of observations needed to reach a decision can be any positive integer, although it can be shown that a decision will be reached in a finite number of observations. Since the number of observations needed to make a decision is indeterminate, the probability that a decision is erroneous is found by summing the probability of an erroneous decision being made after 1 observation, 2 observations, and so on. Formally, in terms of the threshold limits A and B that define the test, the false alarm probability is given by:

$$\alpha = P(\Lambda_{j,1} > B | H_0) + P(B < \Lambda_{j,2} < A, \Lambda_{j,2} \geq B | H_0) + \ldots \tag{E33}$$

The first term in the sum is the probability that the test statistic drops below the lower threshold limit after only one observation given that the alternative hypothesis is true. The second term is the probability that the test statistic drops below the lower threshold limit after two observations given that the alternative hypothesis is true. Similarly, the missed alarm probability is given by:

$$\beta = P(\Lambda_{j,1} \leq A | H_j) + P(B < \Lambda_{j,2} < A, \Lambda_{j,2} < A | H_j) + \ldots \tag{E34}$$

These expressions are by no means easily computed. Moreover, one could not hope to solve these equations for A and B in terms of given $\alpha$ and $\beta$, despite the desirability of being able to do so in setting up a test to provide a specified protection. Although these equations cannot be solved, it can be shown that the error probabilities and the threshold limits are related by the following inequalities $$A \geq \frac{\alpha}{(1-\beta)} \text{ and } \frac{1}{B} \geq \frac{\beta}{(1-\alpha)}. \tag{E35}$$

The error probabilities and the threshold limits are related by inequalities because the test statistic $\Lambda_{j,n}$ does not usually attain exactly the value A or the value B when the test is completed. But since a decision is declared as soon as an observation drives the test statistic past either threshold, the inequalities are almost equalities. Indeed, in practice, A and B are taken to be equal to $\alpha/(1-\beta)$ and $(1-\alpha)/\beta$, respectively. Doing so, of course, means that the sequential hypothesis test actually carried out has error probabilities that are somewhat different than those specified. Let $\alpha'$ and $\beta'$ denote the empirical error probabilities actually attained by a test using specified threshold limits of $A = \alpha/(1-\beta)$ and $B = (1-\alpha)/\beta$. Then according to the inequalities in equation E35, the empirical error probabilities (i.e., $\alpha'$ and $\beta'$) are related to the preassigned error probabilities (i.e., the values of $\alpha$ and $\beta$ used to specify the threshold limits) by $$\frac{\alpha'}{(1-\beta')} \leq A = \frac{\alpha}{(1-\beta)} \text{ and } \frac{\beta'}{(1-\alpha')} \leq \frac{1}{B} = \frac{\beta}{(1-\alpha)}. \tag{E36}$$

Multiplying these through to eliminate denominators, one obtains $$\alpha'\alpha'\beta \leq \alpha - \alpha\beta' \text{ and } \beta' - \alpha\beta' \leq \beta - \alpha'\beta. \tag{E37}$$

Adding these two equations together, one obtains an inequality relating the empirical error probabilities to the preassigned error probabilities:

$$\alpha'+\beta' \leq \alpha+\beta. \tag{E38}$$

One of the key features of the hypothesis test technique is that the designer can specify the error probabilities. This is particularly important for type I errors, because false alarms can cause an operator to make an incorrect decision. Type II errors typically do not lead to incorrect decisions. This is because in the event that a real failure does occur, missed alarms may delay the time to detect the failure but not the ability to detect the failure. The result above (equation E38) shows that the preassigned false alarm probability is not a strict upper limit for the empirical false alarm probability. Similarly, the preassigned missed alarm probability is not a strict upper limit for the empirical missed alarm probability, even when the hypothesis test is applied to purely random data. It is the sum of the preassigned error probabilities that is an upper limit for the sum of the empirical error probabilities. Thus it is possible with purely random data for one of the empirical error probabilities to exceed its corresponding preassigned error probability, but both empirical error probabilities cannot be greater than their corresponding preassigned error probabilities.

True upper bounds for the empirical error probabilities can be determined from the inequalities in equation E36, $$\alpha' \leq \frac{\alpha'}{(1-\beta')} \leq \frac{\alpha}{(1-\beta)} \text{ and } \beta' \leq \frac{\beta'}{(1-\alpha')} \leq \frac{\beta}{(1-\alpha)}. \tag{E39}$$

For small preassigned error probabilities, the true upper bounds are only slightly greater than the preassigned error probabilities. For instance, if both of the preassigned error probabilities are 0.01 then the empirical error probabilities of the test will not exceed 0.0101.

The Sequential Probability Ratio Test (SPRT)

The sequential hypothesis tests described herein above are general statistical tests valid for any pair of related hypotheses. MSET has historically employed four specific sequential hypothesis tests to detect signal faults. These four tests are called the Sequential Probability Ratio Tests, or SPRTs. The SPRTs monitor for changes in the statistical characteristics of the residual signals. A residual signal is the difference between an actual signal and MSET's estimate of that signal. The SPRTs continually monitor a residual signal, generating sequences of decisions. A decision in which the null hypothesis is accepted (i.e., $\Lambda_{j,n} \leq A$) is called a normal decision and implies that the residual signal is behaving as anticipated. A decision in which the alternative hypothesis is accepted (i.e., $\Lambda_{j,n} \geq B$) is called a fault decision and implies that the residual signal is behaving abnormally.

The null hypothesis upon which the SPRTs are based specifies that the residual signal consists of Gaussian data that have a sample mean of 0 and a sample variance of $\sigma_2$. A training procedure, during which the system is operating normally, is used to verify that the mean of the signal is 0 and to evaluate the variance of the signal. Note that if the residual signal does not have a mean of 0, the calculated mean from the training phase is used to normalize the residual signal for the surveillance procedure using the model. Thus the null hypothesis, $H_0$, for the SPRTs is that the signal being analyzed adheres to Gaussian PDF ($N(y; \mu, \sigma^2)$), $$N(y; \mu, \sigma^2) = \frac{1}{\sigma\sqrt{2\pi}} \exp\left[-\frac{1}{2\sigma^2}(y-\mu)^2\right], \tag{E40}$$

for which the mean ($\mu$) is 0 and the variance is $\sigma^2$. Thus, the conditional probability that a discrete observation ($y_1$) occurs given the null hypothesis is expressed as $$P(y_1|H_0) = N(y_1; 0, \sigma^2). \tag{E41}$$

Figure 10:
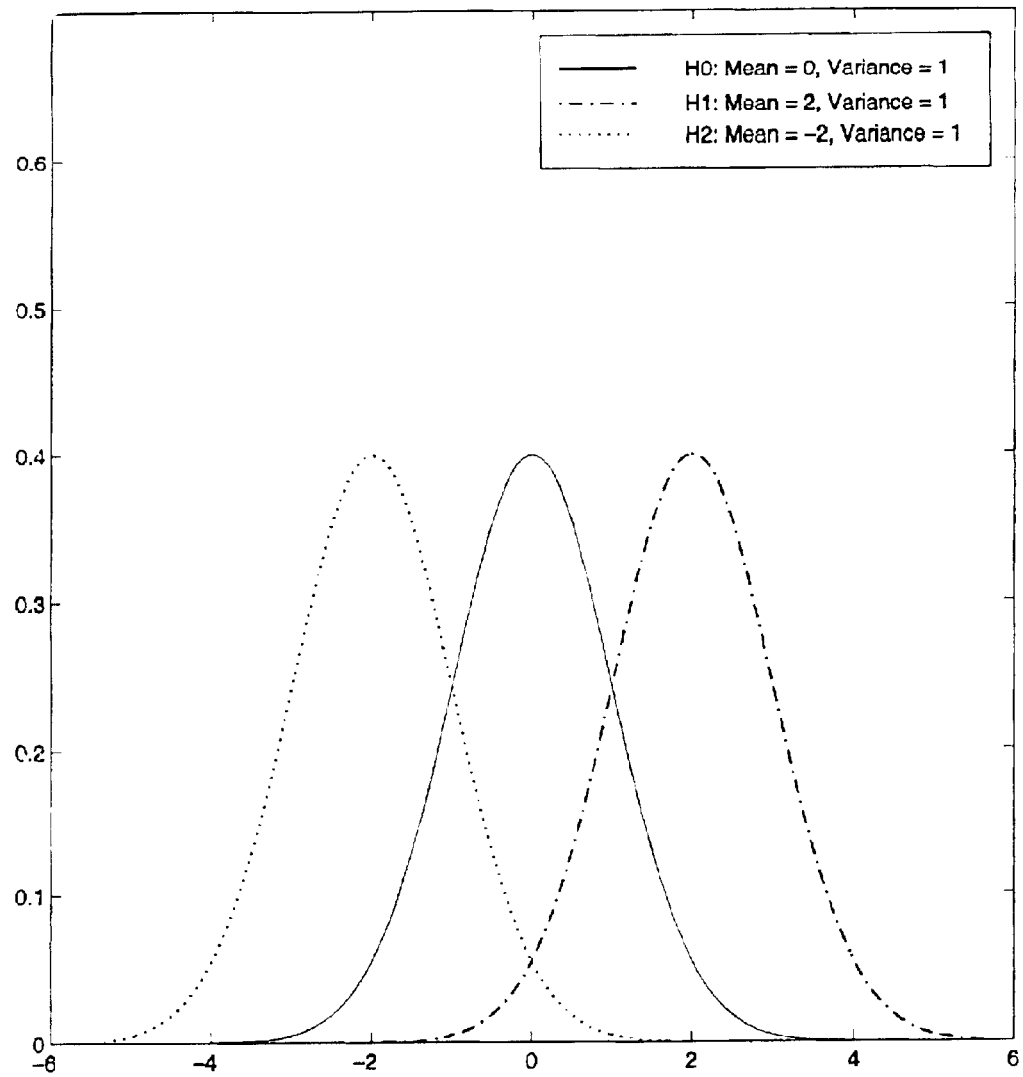
FIG. 10 illustrates characteristics of the null and alternate hypotheses for the prior-art sequential probability ratio test (SPRT) mean tests.
Figure 11:
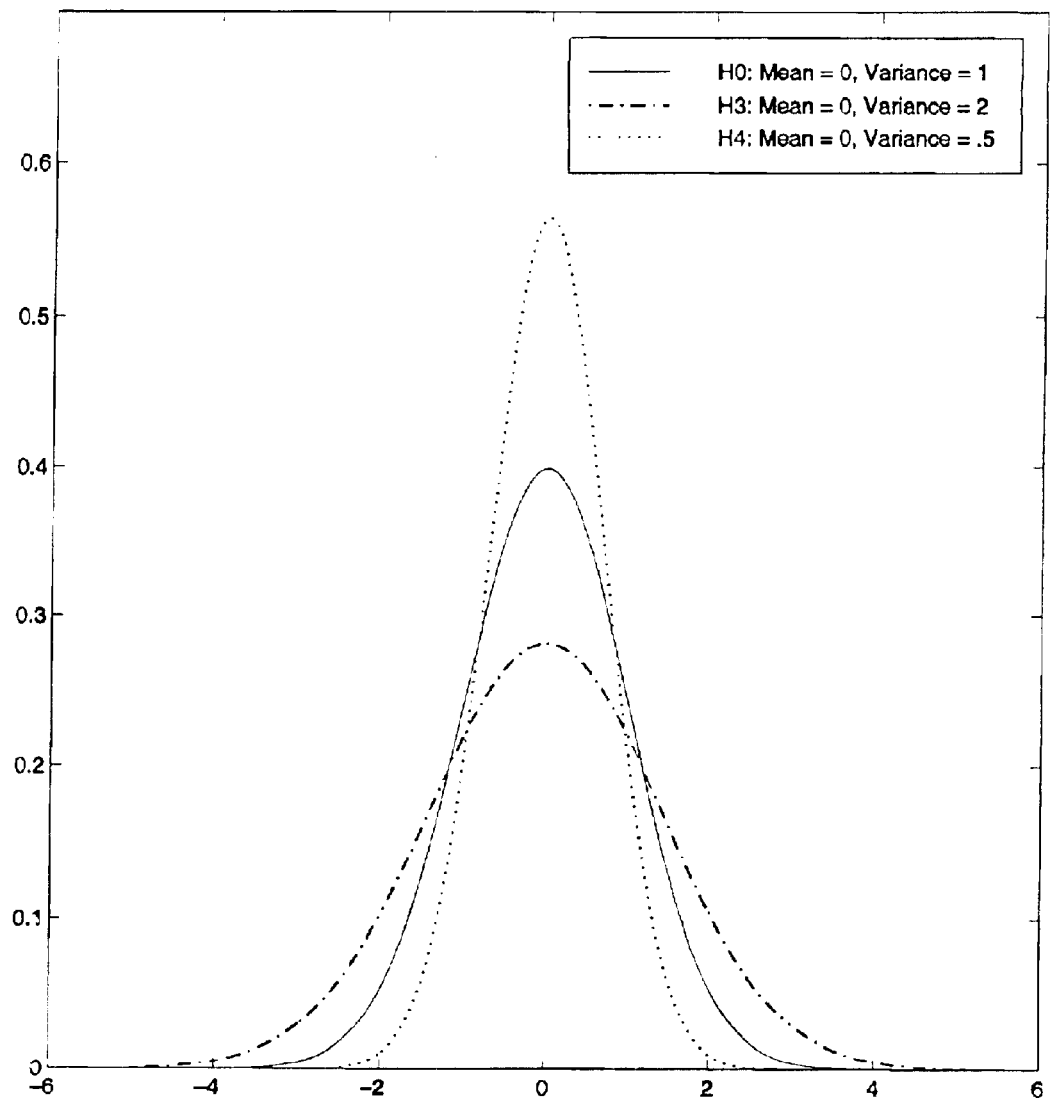
FIG. 11 illustrates characteristics of the null and alternate hypotheses for the prior-art SPRT variance tests.

The four SPRT tests historically used with MSET are the positive mean test, the negative mean test, the nominal variance test, and the inverse variance test. For the positive mean test, the corresponding alternative hypothesis, $H_1$, is that the signal data adhere to a Gaussian PDF with mean $+M$ and variance $\sigma^2$, where M is the preassigned system disturbance magnitude for the mean test. For the negative mean test, the corresponding alternative hypothesis, $H_2$, is that the signal data adheres to a Gaussian PDF with mean $-M$ and variance $\sigma^2$. Referring to FIG. 10, the hypotheses for the two mean tests are illustrated for $M=2$ and $\sigma^2=1$. For the nominal variance test, the alternative hypothesis, $H_3$, is that the signal data adheres to a Gaussian PDF with mean 0 and variance $V\sigma^2$, where V is the preassigned system disturbance magnitude for the variance test. For the inverse variance test, the corresponding alternative hypothesis, $H_4$, is that the signal data adheres to a Gaussian PDF with mean 0 and variance $\sigma^2/V$. Referring to FIG. 11, the hypotheses for the two variance tests are illustrated for $V=2$ and $\sigma^2=1$. The conditional probabilities that a discrete observation ($y_1$) occurs given one of the four alternative hypotheses are expressed as $$P(y_i | H_1) = N(y_i; M, \sigma^2), \tag{E42}$$
$$P(y_i | H_2) = N(y_i; -M, \sigma^2),$$
$$P(y_i | H_3) = N(y_i; 0, V\sigma^2),$$
$$P(y_i | H_4) = N\left(y_i; 0, \frac{\sigma^2}{V}\right).$$

The logarithm of the test statistic for the four SPRT tests can be evaluated by substituting the conditional probabilities from equations E41 and E42 into the general formula (equation E27) and simplifying. Thus, for the positive mean test, $$\ln \Lambda_{1,n} = \sum_{i=1}^{n} \ln\left[\frac{N(y_i; M, \sigma^2)}{N(y_i; 0, \sigma^2)}\right] \tag{E43}$$

$$= \sum_{i=1}^{n} \ln\left[\frac{\exp\left(-\frac{1}{2\sigma^2}(y_i - M)^2\right)}{\exp\left(-\frac{1}{2\sigma^2}y_i^2\right)}\right]$$

$$= \sum_{i=1}^{n} \frac{y_i^2 - (y_i - M)^2}{2\sigma^2}$$

$$= \frac{M}{2\sigma^2} \sum_{i=1}^{n} \left(y_i - \frac{M}{2}\right) \equiv SPRT_{pos}.$$

The equation E43 defines the SPRT index for the positive mean test ($SPRT_{pos}$). A SPRT index is defined for each of the four sequential hypothesis tests. The SPRT indices are the actual quantities computed by the SPRT fault detection procedure. The SPRT index for the negative mean test ($SPRT_{neg}$) is given by $$\ln \Lambda_{2,n} = \sum_{i=1}^{n} \ln\left[\frac{N(y_i; -M, \sigma^2)}{N(y_i; 0, \sigma^2)}\right] \quad \text{(E44)}$$

$$= \frac{M}{2\sigma^2} \sum_{i=1}^{n} \left(-y_i - \frac{M}{2}\right) \equiv SPRT_{neg}.$$

The SPRT index for the nominal variance test ($SPRT_{nom}$) is given by $$\ln \Lambda_{3,n} = \sum_{i=1}^{n} \ln\left[\frac{N(y_1; 0, V\sigma^2)}{N(y_1; 0, \sigma^2)}\right] \quad \text{(E45)}$$

$$= \sum_{i=1}^{n} \ln\left[\frac{\frac{1}{\sqrt{2\pi V\sigma^2}}\exp\left(-\frac{y_1^2}{2V\sigma^2}\right)}{\frac{1}{\sqrt{2\pi\sigma^2}}\exp\left(-\frac{y_1^2}{2\sigma^2}\right)}\right]$$

$$= \sum_{i=1}^{n} \left(\ln\frac{1}{\sqrt{V}} + \frac{y_1^2}{2\sigma^2}\left(1 - \frac{1}{V}\right)\right)$$

$$= \frac{V-1}{2V\sigma^2} \sum_{i=1}^{n} y_1^2 - \frac{1}{2}\ln V \equiv SPRT_{nom}.$$

The SPRT index for the inverse variance test ($SPRT_{inv}$) is given by $$\ln \Lambda_{4,n} = \sum_{i=1}^{n} \ln\left[\frac{N\left(y_1; 0, \frac{\sigma^2}{V}\right)}{N(y_1; 0, \sigma^2)}\right] = \frac{(1-V)}{2\sigma^2} \sum_{i=1}^{n} y_1^2 + \frac{1}{2}\ln V \equiv SPRT_{inv}. \quad \text{(E46)}$$

Novel Improvements to the Fault Detector Training and Surveillance Procedures

Having described the SPRT fault detector training and surveillance methods herein above, the section below describes the novel improvements made by the instant invention when used for fault detector training and surveillance, said improvements being applicable to any asset preferably having at least one characteristic data signal.

The Adaptive Sequential Probability (ASP) Test

The SPRT technique is valid only for residual signals that are random and adhere to Gaussian distributions. Because the MSET parameter estimation algorithm simulates the deterministic components of a set of inter-related raw signals, the residual signals that are produced within MSET are often white-noise processes (i.e., not serially-correlated). Although the MSET residual signals are typically white, they are often non-Gaussian (not normally distributed). If the SPRT fault detection model is applied to signals that are either non-Gaussian, non-white, or both, the theoretical false and missed alarm probabilities may not be achieved. The novel advanced fault detection method of the instant invention, herein named the Adaptive Sequential Probability (ASP) technique or method, solves the problem associated with non-Gaussian, non-white residual signals. The ASP method uses binary hypothesis tests that are numerically tuned to better accommodate the non-Gaussian data distributions that are typical for residual error signals produced by parameter estimation based techniques, such as MSET.

Mathematical Foundations of the ASP Test

The Adaptive Sequential Probability (ASP) method defines four new sequential hypothesis tests. The Adaptive Sequential Probability method is an advanced failure detection technique that broadens the domain of applicability of the SPRT technique to non-Gaussian PDFs. In the ASP method, the assumption that the data fit a Gaussian PDF is relaxed and the test statistic is evaluated for any arbitrary data distribution. In the ASP method, the signal is assumed to consist of random observations that adhere to a specific PDF that is a function of the sample mean, variance, and possibly higher order terms. The PDF is denoted by the general function $\Im(y; \mu, \sigma^2, \ldots)$. The parameter list of the function is open-ended to indicate that additional terms, such as the sample skewness, kurtosis, or width of the distribution at half-maximum, may be required to characterize the function.

The null hypothesis upon which the ASP tests are based specifies that the data distribution has a sample mean of 0 and a sample variance of $\sigma^2$. A training phase, during which the system is operating normally, is used to verify that the mean of the signal is 0 and to evaluate the sample variance. If the PDF is dependent upon any other additional terms, they are also evaluated during the training phase for numerically tuning one or more probability functions obtained by fitting an open-ended general probability functions to one or more data distributions obtained during typical or normal operating conditions of the asset under surveillance. Thus, the conditional probability that a discrete observation ($y_1$) occurs given the null hypothesis is expressed as $$P(y_1|H_0) = \Im(y_1; 0, \sigma^2, \ldots). \quad \text{(E47)}$$

Typically, four sequential hypothesis tests (i.e., a positive mean test, a negative mean test, a nominal variance test, and a inverse variance test) are utilized by the ASP method. For the positive mean test, the corresponding alternative hypothesis, $H_1$, is that the signal data adhere to the specified PDF with mean $+M$ and variance $\sigma^2$ where M is a preassigned system disturbance magnitude for the mean test. For the negative mean test, the corresponding alternative hypothesis, $H_2$, is that the signal data adheres to the specified PDF with mean $-M$ and variance $\sigma^2$. For the nominal variance test, the corresponding alternative hypothesis, $H_3$, is that the signal data adhere to the specified PDF with mean 0 and variance $V\sigma^2$ where V is a preassigned system disturbance magnitude for the variance test. For the inverse variance test, the corresponding alternative hypothesis, $H_4$, is that the signal data adhere to the specified PDF with mean 0 and variance $\sigma^2/V$. The conditional probabilities that a discrete observation ($y_1$) occurs given one of the four alternative hypotheses are expressed as $$P(y_i|H_1) = \Im(y_i; M, \sigma^2, \ldots), \quad \text{(E48)}$$
$$P(y_i|H_2) = \Im(y_i; -M, \sigma^2, \ldots),$$
$$P(y_i|H_3) = \Im(y_i; 0, V, \sigma^2, \ldots),$$
$$P(y_i|H_4) = \Im\left(y_i; 0, \frac{\sigma^2}{V}, \ldots\right).$$

The logarithm of the test statistic for the four ASP tests can be evaluated by substituting the conditional probabilities from equations E47 and E48 into the general formula (equation E27). The logarithm of the test statistic for a given test is defined to be the ASP index for that test. The ASP index for the positive mean test ($ASP_{pos}$) is given by $$\ln \Lambda_{1,n} = \sum_{i=1}^{n} \ln\left[\frac{\Im(y_i; M, \sigma^2, \ldots)}{\Im(y_i; 0, \sigma^2, \ldots)}\right] \equiv ASP_{pos}. \tag{E49}$$

The ASP index for the negative mean test ($ASP_{neg}$) is given by $$\ln \Lambda_{2,n} = \sum_{i=1}^{n} \ln\left[\frac{\Im(y_i; -M, \sigma^2, \ldots)}{\Im(y_i; 0, \sigma^2, \ldots)}\right] \equiv ASP_{neg}. \tag{E50}$$

The ASP index for the nominal variance test ($ASP_{nom}$) is given by $$\ln \Lambda_{3,n} = \sum_{i=1}^{n} \ln\left[\frac{\Im(y_i; 0, \sigma^2, \ldots)}{\Im(y_i; 0, \sigma^2, \ldots)}\right] \equiv ASP_{nom}. \tag{E51}$$

The ASP index for the inverse variance test ($ASP_{inv}$) is given by $$\ln \Lambda_{4,n} = \sum_{i=1}^{n} \ln\left[\frac{\Im\left(y_i; 0, \frac{\sigma^2}{V}, \ldots\right)}{\Im(y_i; 0, \sigma^2, \ldots)}\right] \equiv ASP_{inv}. \tag{E52}$$

The ASP tests are then implemented in the same manner as the SPRT tests. Namely, for each time step in the calculation, the four ASP indices are calculated (equations E49 through E52). Each ASP index is compared to the upper and lower log-thresholds and the status of the test is evaluated (i.e., faulted, normal, or continuing).

ASP Method for Near-Gaussian Distributions

The Adaptive Sequential Probability method consists of four specific sequential hypothesis tests applied to non-Gaussian data distributions. In order to use the method, a general PDF, $\Im(y; \mu, \sigma^2, \ldots)$, must be defined for the target signal. In this section, the ASP method is derived for data distributions that are nearly Gaussian.

In applications of MSET to the Space Shuttle Main Engine accelerometer signals, applicants discovered that the residual signals produced by the system model have a nearly, but not truly, Gaussian behavior, as described in Dynamics Sensor Data Validation Phase I Final Report, by applicants: Randall L. Bickford and James P. Herzog, NASA Contract NAS8-40874, Jul. 1, 1997. When plotted as a histogram, the residual data will appear to have the same bell-curve shape as a Gaussian distribution. But when a Gaussian PDF of the same mean, standard deviation, and area as the data distribution is superimposed on it, the histogram was found by applicants to be non-Gaussian. Typically, applicants found that the histogram has thicker tails than the Gaussian curve, which corresponds to a sample kurtosis that is greater than 3.

A PDF can be written as a sum of a standard normal distribution, $Z(x)$, and a remainder term, $R(x)$, as described in Mathematical Methods of Statistics, by H. Cramer, Princeton University Press, Princeton, N.J., 1946.

$$\Im(x) = Z(x) + R(x), \tag{E53}$$

where the standard normal PDF $$Z(x) = \frac{1}{\sqrt{2\pi}} \exp\left(-\frac{x^2}{2}\right) \tag{E54}$$

is a function of the dimensionless variable $x=(y-\mu)/\sigma$. The standard normal PDF is related to the general Gaussian PDF (equation E40) through the normalization condition:

$$\int_{-\infty}^{\infty} Z(x) dx = \int_{-\infty}^{\infty} N(y; \mu, \sigma^2) dy = 1. \tag{E55}$$

The remainder term can be expressed as an infinite series of orthogonal polynomials whose terms are functions of derivatives of the standard normal PDF. The constant coefficients of the polynomial terms are dependent on the central moments of the target distribution. As described in Handbook of Mathematical Functions, by M. Abramowitz and I. A. Stegun, Dover Publications, Inc., New York, 1972, the first four terms in the series expansion of the remainder function are:

$$\begin{aligned}R(x) = & -\left[\frac{1}{3!}\frac{\mu_3}{\sigma^3}Z^{(3)}(x)\right] + \left[\frac{1}{4!}\left(\frac{\mu_4}{\sigma^4}-3\right)Z^{(4)}(x) + \right. \\ & \frac{10}{6!}\left(\frac{\mu_3}{\sigma^3}\right)^2 Z^{(6)}(x)\bigg] - \left[\frac{1}{5!}\left(\frac{\mu_5}{\sigma^5}-10\frac{\mu_3}{\sigma^3}\right)Z^{(5)}(x) + \right. \\ & \frac{35}{7!}\frac{\mu_3}{\sigma^3}\left(\frac{\mu_4}{\sigma^4}-3\right)Z^{(7)}(x) + \frac{280}{9!}\left(\frac{\mu_3}{\sigma^3}\right)^3 Z^{(9)}(x)\bigg] + \\ & \left[\frac{1}{6!}\left(\frac{\mu_6}{\sigma^6}-15\frac{\mu_4}{\sigma^4}-10\left(\frac{\mu_3}{\sigma^3}\right)^2+30\right)Z^{(6)}(x) + \left(\frac{35}{8!}\right)Z^{(8)}(x) + \right. \\ & \frac{2100}{10!}\left(\frac{\mu_3}{\sigma^3}\right)^2\left(\frac{\mu_4}{\sigma^4}-3\right)Z^{(10)}(x) + \\ & \left. \frac{15400}{12!}\left(\frac{\mu_3}{\sigma^3}\right)^4 Z^{(12)}(x)\right] + \ldots \, .\end{aligned} \tag{E56}$$

The $\mu_i$ factors are central moments of the discrete data sequence $\{Y_n\}=(y_1, y_2, \ldots, y_n)$, $$\mu_i = \frac{1}{n}\sum_{j=1}^{n}(y_j - \mu)^i \text{ with } \mu = \frac{1}{n}\sum_{j=1}^{n} y_j \text{ and} \tag{E57}$$

$$\mu_2 \equiv \sigma^2 = \frac{1}{n}\sum_{j=1}^{n}(y_j - \mu)^2.$$

The $Z^{(n)}(x)$ functions are derivatives of the standard normal PDF. The nth derivative of the standard normal PDF is given by:

$$Z^{(n)}(x) \equiv \frac{d^n}{dx^n} Z(x) = (-1)^n He_n(x) Z(x), \tag{E58}$$

where $He_n(x)$ are the Hermite polynomials. The first twelve Hermite polynomials are $He_1(x)=x$, $He_2(x)=x^2-1$, $He_3(x)=x^3-3x$, $He_4(x)=x^4-6x^2+3$, $He_5(x)=x^5-10x^3+15x$, $He_6(x)=x^6-15x^5+45x^2-15$, $He_7(x)=x^7-21x^5+105x^3-105x$, $He_8(x)=x^8-28x^6+210x^4-420x^2+105$, $He_9(x)=x^9-36x^7+378x^5-1260x^3+945x$, $He_{10}(x)=x^{10}-45x^8+630x^6-3150x^4+4725x^2-945$, $He_{11}(x)=x^{11}-55x^9+990x^7-6930x^5+17325x^3-10395x$, $He_{12}(x)=x^{12}-66x^{10}+1485x^8-13860x^6+51975x^4-62370x^2+10395$ (E59)

Each term in the series expansion of the remainder function R(x) is more complex than the previous term as higher central moments of the data distribution and higher derivatives of the standard normal PDF are introduced. The nth term in the remainder function depends on the central moments from order 1 (i.e., mean) through order n+2. Thus, the first term depends on moments through the third central moment (i.e., skewness), the second term depends on moments through the fourth central moment (i.e., kurtosis), and so on.

If the data distribution that is to be approximated with equation E53 is nearly Gaussian, a good approximation will be achieved with only a few of the terms in the series. In the ASP method for near-Gaussian distributions, the data distribution is first approximated with the standard normal PDF, Z(x). The approximation is refined by adding successively higher terms of the remainder function until an adequate fit between the general PDF, $\Im(x)$, and the data distribution is produced. In practice it is usually not advisable to go beyond the fourth term in the remainder function because the tail regions of the general PDF become unstable.

Using the equations for the derivatives of the standard normal PDF (equations E59 and E59), the remainder function can be written as a product of the standard normal PDF and a polynomial whose coefficients depend on the central moments of the data distribution.

$$R(x) = Z(x) \sum_{i=1}^{n} r_i(x),$$ (E60)

where the first four terms in the series are $$r_1(x) = \frac{1}{6} \frac{\mu_3}{\sigma^3} He_3(x),$$ (E61)

$$r_2(x) = \frac{1}{24}\left(\frac{\mu_4}{\sigma^4} - 3\right)He_4(x) + \frac{1}{72}\left(\frac{\mu_3}{\sigma^3}\right)^2 He_6(x),$$ (E62)

$$r_3(x) = \frac{1}{120}\left(\frac{\mu_5}{\sigma^5} - 10\frac{\mu_3}{\sigma^3}\right)He_5(x) +$$ (E63)
$$\frac{1}{144}\frac{\mu_3}{\sigma^3}\left(\frac{\mu_4}{\sigma^4} - 3\right)He_7(x) + \frac{1}{1296}\left(\frac{\mu_3}{\sigma^3}\right)^3 He_9(x),$$

$$r_4(x) = \frac{1}{720}\left(\frac{\mu_6}{\sigma^6} - 15\frac{\mu_4}{\sigma^4} - 10\left(\frac{\mu_3}{\sigma^3}\right)^2 + 30\right)He_6(x) +$$ (E64)
$$\frac{1}{1152}\left(\frac{\mu_4}{\sigma^4} - 3\right)^2 He_8(x) +$$
$$\frac{1}{720}\frac{\mu_3}{\sigma^3}\left(\frac{\mu_5}{\sigma^5} - 10\frac{\mu_3}{\sigma^3}\right)He_8(x) +$$
$$\frac{1}{1728}\left(\frac{\mu_3}{\sigma^3}\right)^2\left(\frac{\mu_4}{\sigma^4} - 3\right)He_{10}(x) + \frac{1}{31104}\left(\frac{\mu_3}{\sigma^3}\right)^4 He_{12}(x).$$

Thus, the series expansion formula for the approximation of the general PDF is $$\Im(x) \approx Z(x) + Z(x) \sum_{i=1}^{n} r_i(x).$$ (E65)

Application of the ASP Method to Space Shuttle Main Engine Residual Signals

Figure 12:
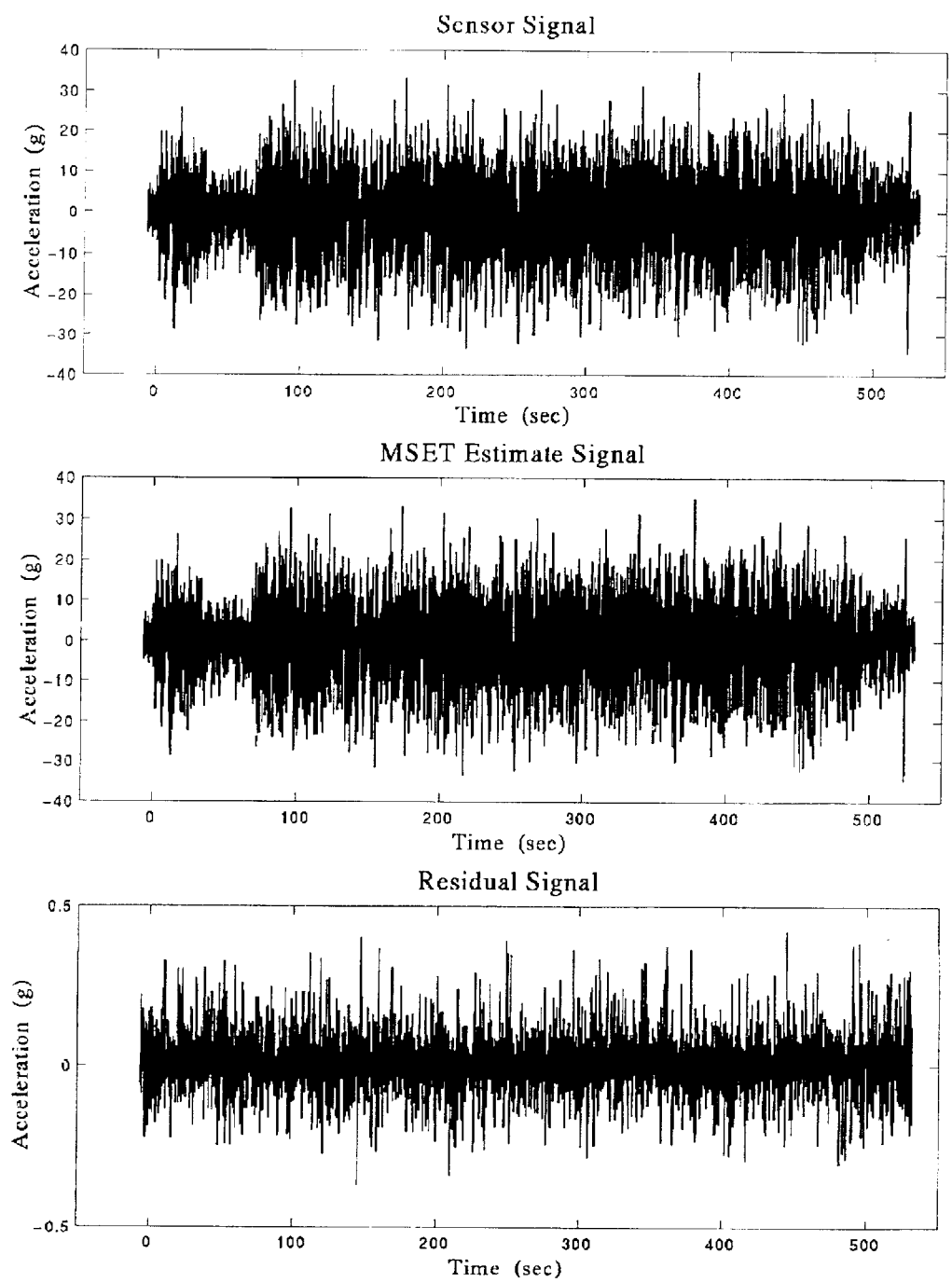
FIG. 12 illustrates acquired operating data, estimated parameter data, and residual error data for a typical Space Shuttle Main Engine accelerometer.

In one application use and operation, and in one preferred embodiment, the ASP technique was reduced to practice to provide highly reliable data validation for high frequency Space Shuttle Main Engine (SSME) accelerometers. Each SSME is monitored by eight high frequency (10.24 kHz) accelerometers with three sensors mounted on each of the two high pressure turbopumps and two sensors mounted on the engine gimbal bearing. Several MSET models were prepared to validate the ASP method for the six turbopump accelerometers. The MSET pattern recognition algorithm produces extremely accurate simulations of turbopump accelerometer behavior. Referring to FIG. 12, some results from applying the six sensor MSET model to a typical Space Shuttle flight (i.e., flight STS057, engine 1) are shown. For the calculation shown in FIG. 12, the MSET training algorithm extracted a small fraction of the data in the accelerometer signals to simulate the behavior of the accelerometers (the process memory matrix contained only 0.0083% of the raw signal data). In the top plot, the highly dynamic signal from the first SSME turbopump accelerometer in the model (i.e., the oxidizer preburner pump 45 accelerometer) is shown as a function of time from the launch of the Space Shuttle. In the middle plot, MSET's estimate of the accelerometer signal shows the very high accuracy of the MSET simulation. The residual signal for the calculation, which is the difference between the sensor signal and MSET's estimate of that signal, is shown in the bottom plot. The relative error in the calculation, as measured by the ratio of the standard deviation of the residual signal to the standard deviation of the sensor signal, is only 0.86%. The results shown in FIG. 12 illustrate MSETs ability to accurately model highly dynamic signals, even when only a tiny fraction of available data is used to represent the signal behavior.

Figure 13:
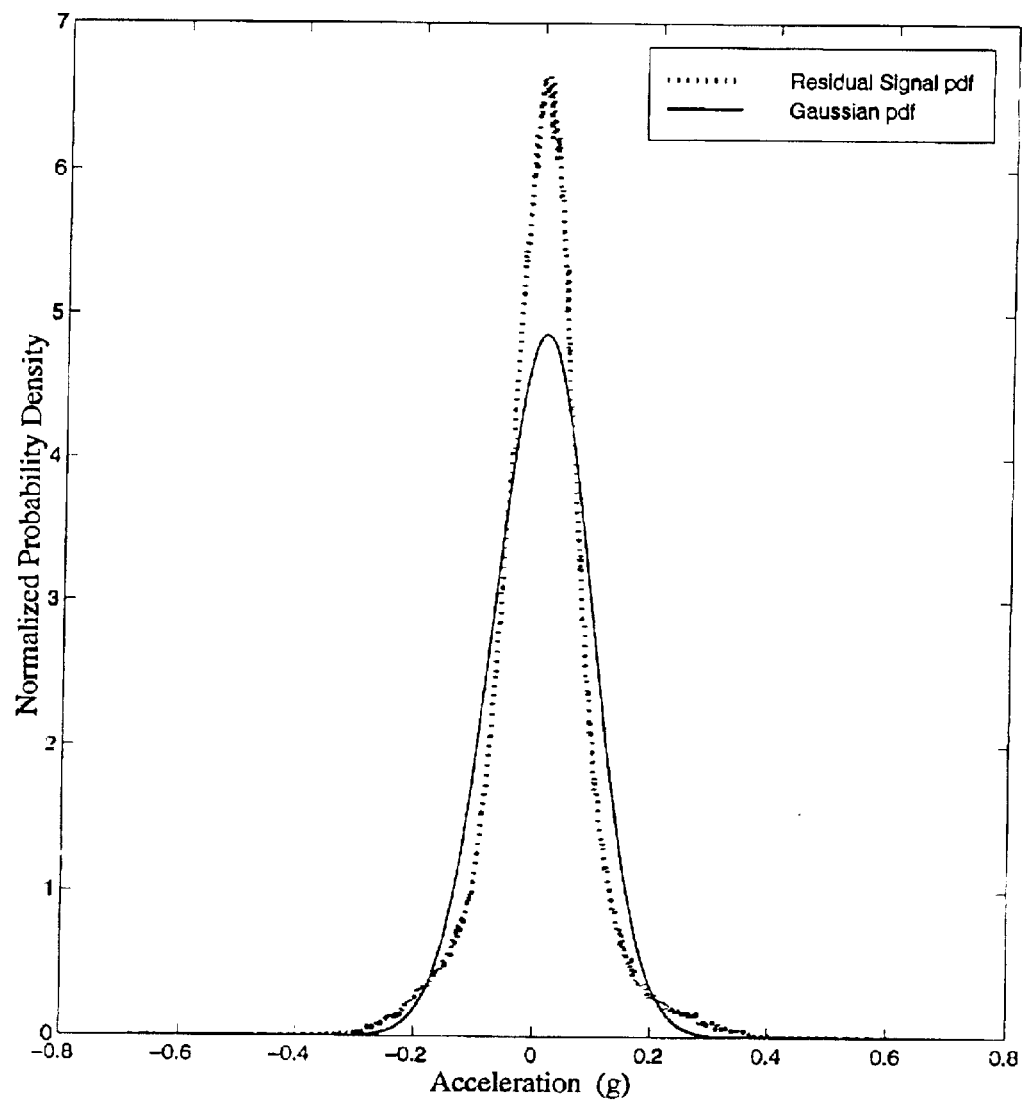
FIG. 13 illustrates a probability density function of the residual error data for a typical Space Shuttle Main Engine accelerometer with comparison to a Gaussian probability density function.

Still referring to FIG. 12, the residual signal for the analysis of a typical SSME accelerometer appears to be random. Referring to FIG. 13, the distribution of data in the residual signal is shown. The probability density for the residual signal was approximated by dividing the data range into m equally-sized bins and then counting the number of residual signal data values that fall into each bin. The count number is a discrete function of the sequence $\{Y_m\}=y_1$, $y_2, \ldots, y_m$, where the ith element in the sequence $(y_1)$ is given by $$y_1 = y_{min} + i\frac{(y_{max} - y_{min})}{m},$$ (E66)

and $y_{min}$ is the minimum datum and $y_{max}$ is the maximum datum in the residual signal. A normalized residual signal PDF is produced by dividing each element in the count number function by the total number of elements in the residual signal. The number of bins used to produce the residual signal PDFs was 1000. As shown in FIG. 13, a PDF for a typical residual signal has a nearly Gaussian shape. Superimposed on top of residual signal PDF is a Gaussian PDF of the same mean, standard deviation, and area as the residual signal PDF. The first four moments of the residual signal data are as follows: mean=$1.1*10^{-4}$ g, standard deviation=$8.2*10^{-2}$ g, skewness=0.32, and kurtosis=5.7, where the skewness and kurtosis are related to the third and fourth central moments of the data by $$\text{skewness} = \frac{\mu_3}{\sigma^3} \text{ and kurtosis} = \frac{\mu_4}{\sigma^4}. \tag{E67}$$

Because the kurtosis of the distribution is greater than 3, the residual signal PDF has thicker tail regions than a true Gaussian distribution. This is confirmed by a visual examination of FIG. 13.

The ASP method for near-Gaussian distributions was applied to the residual signals from the MSET model of the SSME accelerometers. The residual signal PDFs were approximated with the series expansion formula of a general PDF (equations E60 through E65). Four calculations were performed for each residual signal in the model. In the first calculation, the residual signals were approximated with the one-term series expansion formula. In the one-term formula, the remainder function (R(x)) is given by the product of the standard normal PDF and the first term in the series, $r_1(x)$. Subsequent calculations introduced additional terms from the series, culminating with the four-term formula in which the remainder function is given by the product of the standard normal PDF and the four term series, $r_1(x)+r_2(x)+r_3(x)+r_4(x)$.

For each calculation, the quality of the approximation is measured by the root mean-squared (rms) error of the calculation. The rms error ($E_{rms}$) is a function of the difference between the calculated PDF ($\Im(x)$) from equation E65 and the residual signal PDF (F(x)), $$E_{rms} = \left[\frac{1}{m}\sum_{l=1}^{M}(\Im(x_i) - F(x_i))^2\right]^{1/2}. \tag{E68}$$

The calculated and residual signal PDFs are discrete functions of the dimensionless variable $x_i=(y_1-\mu)/\sigma$, where $y_1$ is an element in the sequence that spans the range of data in the residual signal distribution (see equation E66).

Figure 14:
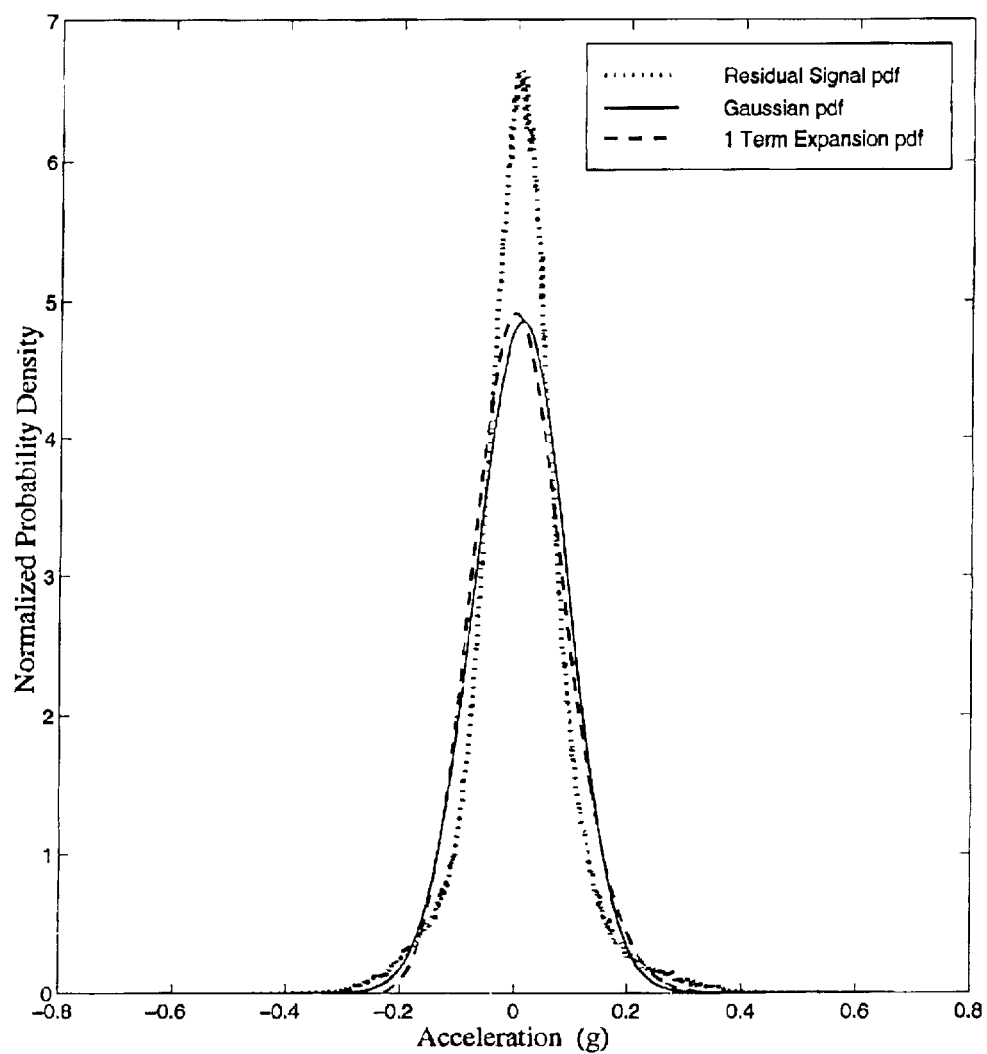
FIG. 14 illustrates an un-optimized one-term expansion probability density function model of the residual error data for a typical Space Shuttle Main Engine accelerometer with comparison to the actual residual error data and a Gaussian probability density function.
Figure 15:
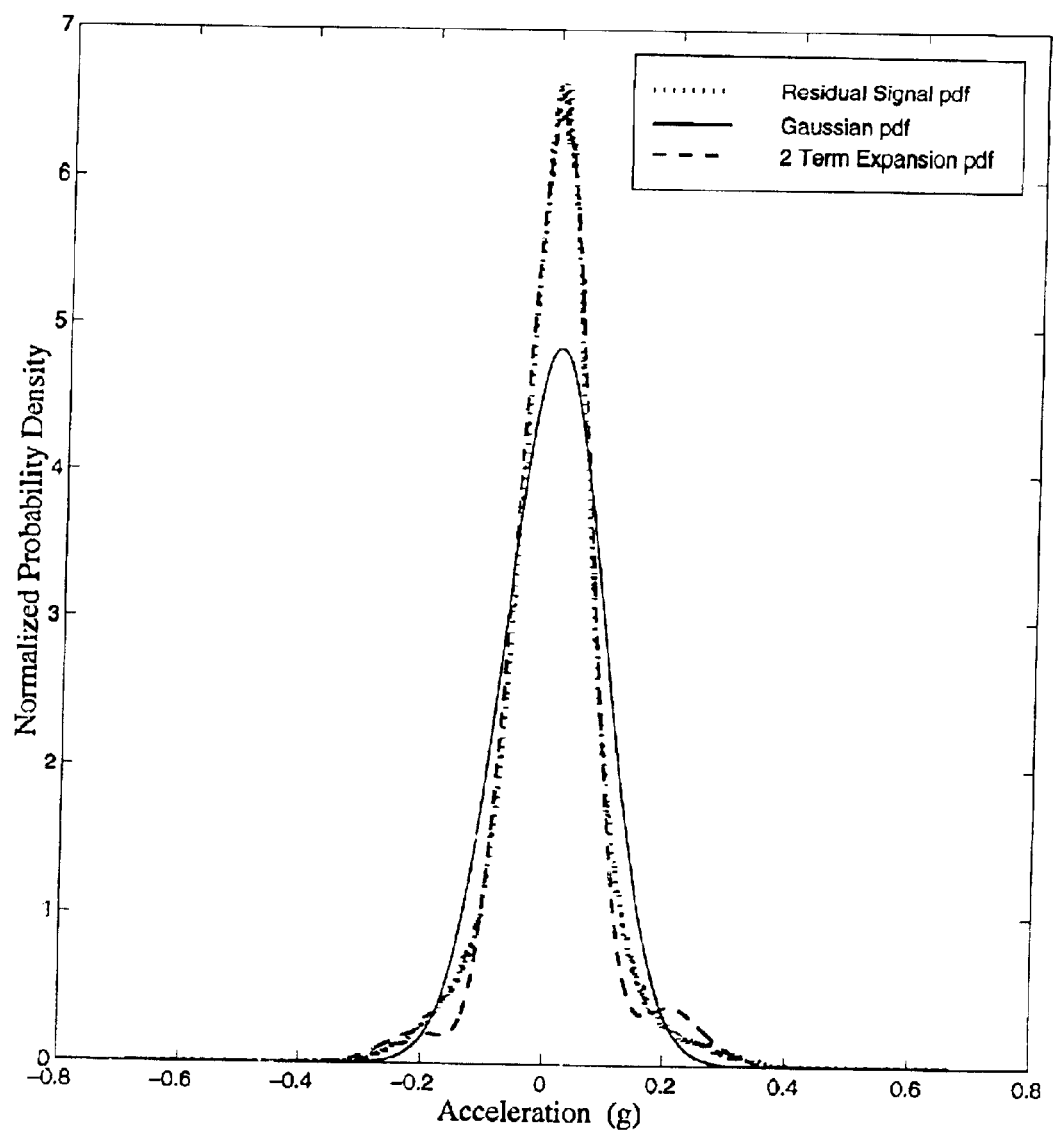
FIG. 15 illustrates an un-optimized two-term expansion probability density function model of the residual error data for a typical Space Shuttle Main Engine accelerometer with comparison to the actual residual error data and a Gaussian probability density function.
Figure 16:
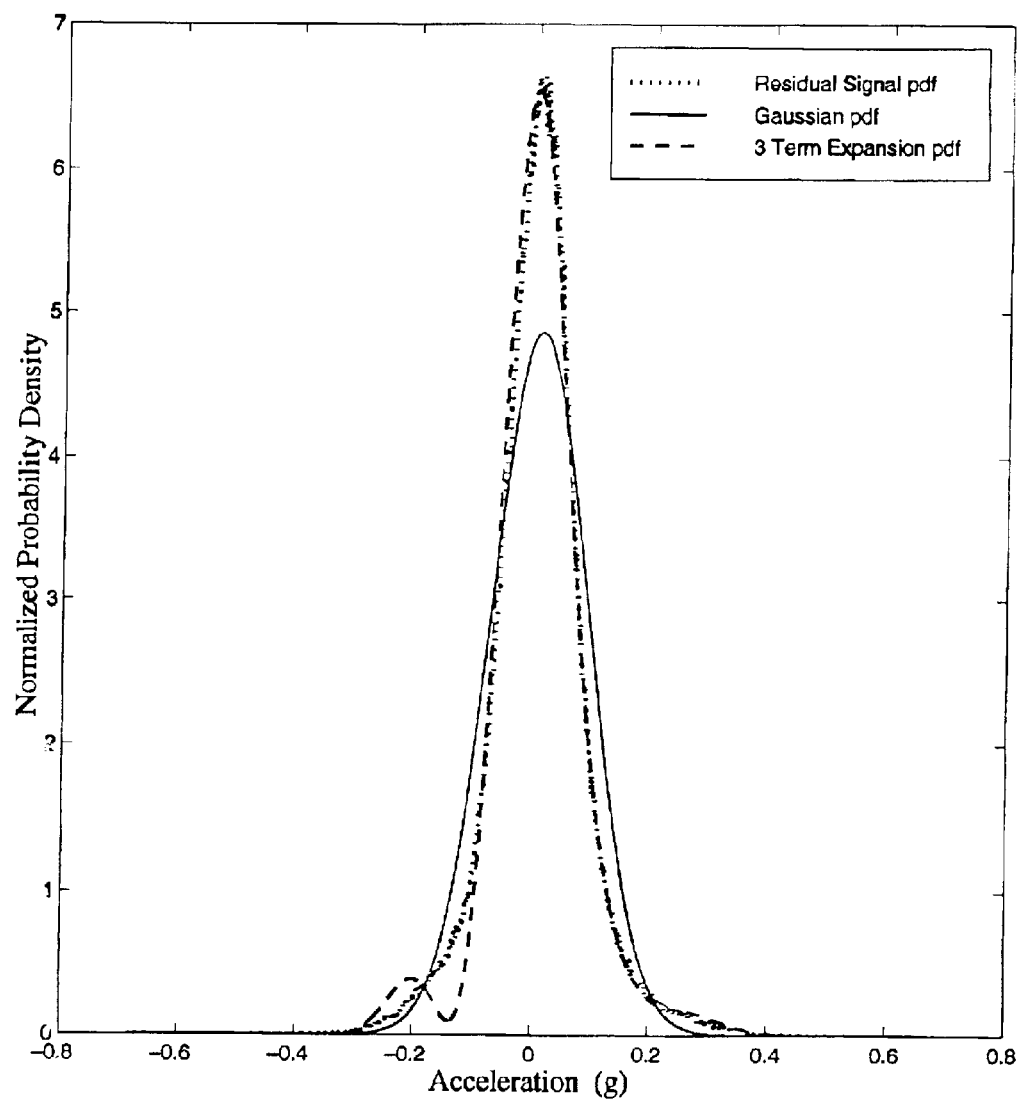
FIG. 16 illustrates an un-optimized three-term expansion probability density function model of the residual error data for a typical Space Shuttle Main Engine accelerometer with comparison to the actual residual error data and a Gaussian probability density function.

In general terms, each additional term in the series expansion improves the approximation of the residual signal PDFs. Referring to FIG. 14, FIG. 15 and FIG. 16, adding terms from the series expansion formula improves the fit of the residual signal PDF from the first sensor. The approximation of the residual signal PDF generated by the one-term series expansion formula is compared to a Gaussian approximation and the residual signal PDF in FIG. 14. The one-term approximation shows little improvement over the Gaussian approximation. The rms error for the Gaussian PDF is 0.414, while the rms error for the one-term series expansion PDF is slightly smaller at 0.409. The PDF generated by the two-term series expansion formula is shown in FIG. 15. The fit of the two-tern approximation is significantly better than that of the Gaussian approximation. The two-term formula provides an excellent fit of the residual signal PDF, especially near the peak in the distribution. The greatest source of error in the approximation occurs in the transition regions of the distribution, between 1 and 4 standard deviations from the mean. The rms error for the two-term series expansion PDF is 0.122, which is nearly a factor of four smaller than the rms error of the Gaussian PDF. The PDF generated by the three-term series expansion formula is shown in FIG. 16. The three-term formula provides a better fit of the peak in the distribution than does the two-term formula. The rms error for the three-term approximation is 0.151, which is slightly larger than that of the two-term approximation because its fit of the lower transition region is less accurate than that of the two-term approximation.

The rms errors of the four calculations for each of the sensors in the model are listed in FIG. 17. Also included in FIG. 17 are the rms errors for Gaussian PDFs of the same mean, standard deviation, and area as the residual signal PDFs. As indicated by the data in the first two columns of FIG. 17, the one-term series expansion formula produces PDFs that are slightly more accurate than the corresponding Gaussian PDFs. Significant improvement is exhibited by the two-term series expansion formula, which produces PDFs whose rms errors are as much as a factor of four smaller than those from the corresponding Gaussian and one-term series expansion approximations. The three-term series expansion formula generally produces larger rms errors than does the two-term formula because the fit of the transitions regions of the distribution is less accurate. This trend is further exhibited by the four-term series expansion formula. For three of the calculations (i.e., sensor numbers 1, 2, and 6), the four-term approximations are unstable in the transition regions, resulting in rms errors that are much larger than those of the corresponding Gaussian approximations. The four-term series expansion formula produces an improved approximation for the residual signal from sensor number 5 only. The residual signal for this accelerometer is the most nearly Gaussian of the sensors to begin with, as indicated by the rms errors for the Gaussian approximations for all six sensors. These results suggest that the higher order terms in the series expansion should be used with caution: only those PDFs that are nearly Gaussian to begin with should be approximated with terms higher than the second term in the series expansion.

In the ASP method for near-Gaussian distributions, the central moments of the distribution to be approximated are used to evaluate the coefficients in the series expansion. A second approach, known as the optimized ASP method for near-Gaussian distributions, was also evaluated. In the second approach, the higher-order central moments (i.e., $\mu_3$, $\mu_4$, $\mu_5$, and $\mu_6$) are treated as free parameters in the model and the approximation is optimized by searching for values of the central moments that provide the best fit of the distribution. In this approach, the simplex optimization method is used to minimize the rms error of the calculation, as described in A Simplex Method for Function Minimization, by J. A. Nelder and R. Mead, Computer Journal, Vol. 7, 1965, at pages 308 through 313. The simplex method is particularly useful for minimizing complicated transcendental functions of two or more variables because it minimizes a function by utilizing evaluations of the function only—no evaluations of function derivatives are required.

In the optimized ASP method for near-Gaussian distributions, the first step is to select the approximation formula to be optimized, either the one, two, three, or four-term series expansion formula. The number of free parameters in the model is determined by the approximation formula used. For instance, the one-term formula requires only one free parameter (i.e., $\mu_3$), whereas the four-term formula requires four free parameters (i.e., $\mu_3$, $\mu_4$, $\mu_5$, and $\mu_6$). The function that is minimized by the simplex algorithm is the rms error for the approximation, given by equation E68. The higher-order central moments of the distribution are used as initial values of the free parameters in the model. The simplex algorithm iterates on the free parameters until a minimum in the function is found, thereby producing the best fit (i.e., smallest rms error) between the calculated PDF and the residual signal PDF, for a given approximation formula The rms errors of the calculations using the optimized ASP method for near-Gaussian distributions are listed in FIG. 18. Also included in FIG. 18 are the rms errors for Gaussian PDFs of the same mean, standard deviation, and area as the residual signal PDFs. Comparing the rms errors of the Gaussian approximations to those from the optimized calculations shows that all optimized series expansion formulas produce significant reductions in the rms error. Comparing the data in FIG. 18 to those of FIG. 17 shows that the optimized ASP method produces more accurate approximations than does the ASP method for each series expansion formula. For a given sensor, the optimized two-term series expansion formula produces rms errors that are roughly a factor of two smaller than those of the optimized one-term formula. The optimized three-term and four-term series expansion formulas though, produce rms errors that are roughly equivalent to those of the optimized two-term formula. Since the three-term and four-term models incorporate more complicated functions with more free parameters than the two-term model, these results indicate that the optimized two-term series expansion method provides the best balance between accuracy and efficiency.

Figure 19:
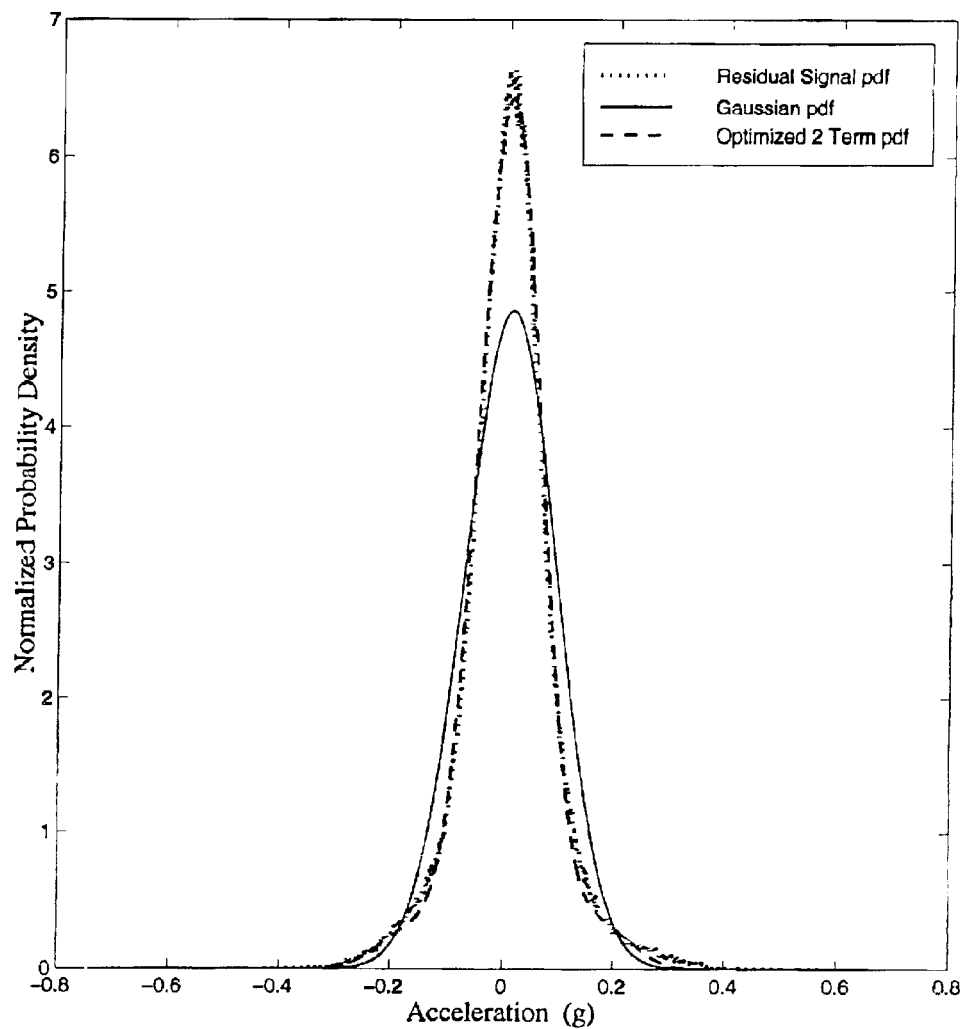
FIG. 19 illustrates the optimized two-term expansion probability density function model of the residual error data for a typical Space Shuttle Main Engine accelerometer with comparison to the actual residual error data and a Gaussian probability density function.

The PDF generated by the optimized two-term series expansion formula for the first sensor is shown in FIG. 19. The optimized two-term formula provides an excellent fit of the residual signal PDF across all regions of the distribution, including the transition regions. Comparing the results of the optimized ASP calculation in FIG. 19 to those from corresponding ASP calculations in FIG. 15 and FIG. 16, reveals that the main effect of the optimization is to improve the accuracy of the approximation through the transition regions of the distribution.

The optimized ASP method for near-Gaussian distributions produces an excellent fit of the residual signal distributions from the MSET model of SSME accelerometer signals. Because the optimized ASP method is tuned to the specific data distributions analyzed, the empirical error probabilities for the method will better adhere to the theoretical limits for the fault detection procedure.

A parametric study of the empirical false alarm rate was performed to compare the false alarm of the SPRT method to the new ASP method for the SSME residual signals. In the study, the residual signals generated by applying the six sensor MSET model to the accelerometer signals from flight STS057 engine 1 were analyzed with the SPRT and ASP sequential hypothesis tests at various values of the false alarm probability and the system disturbance magnitude parameters. Because of the high frequency of the accelerometer signals (10.24 kHz) and long duration of the flight (542.4 sec), the residual signals contain over five million data values. The residual signal data set was so large that every tenth point was extracted from the signals and the fault detection models were applied to the subset. The subset of the residual signals was large enough to produce accurate statistics but small enough to permit multiple calculations in a reasonable time span. Typically, the sequential hypothesis tests make a decision for every 1 to 10 data points analyzed. Thus for the parametric calculations of the SSME residual signals, hundreds of thousands of decisions were made for each signal. By dividing the number of fault decisions from a SPRT analysis of a residual signal into the total number of fault and normal decisions made by the test, the empirical false alarm rate could be accurately evaluated.

Figure 20:
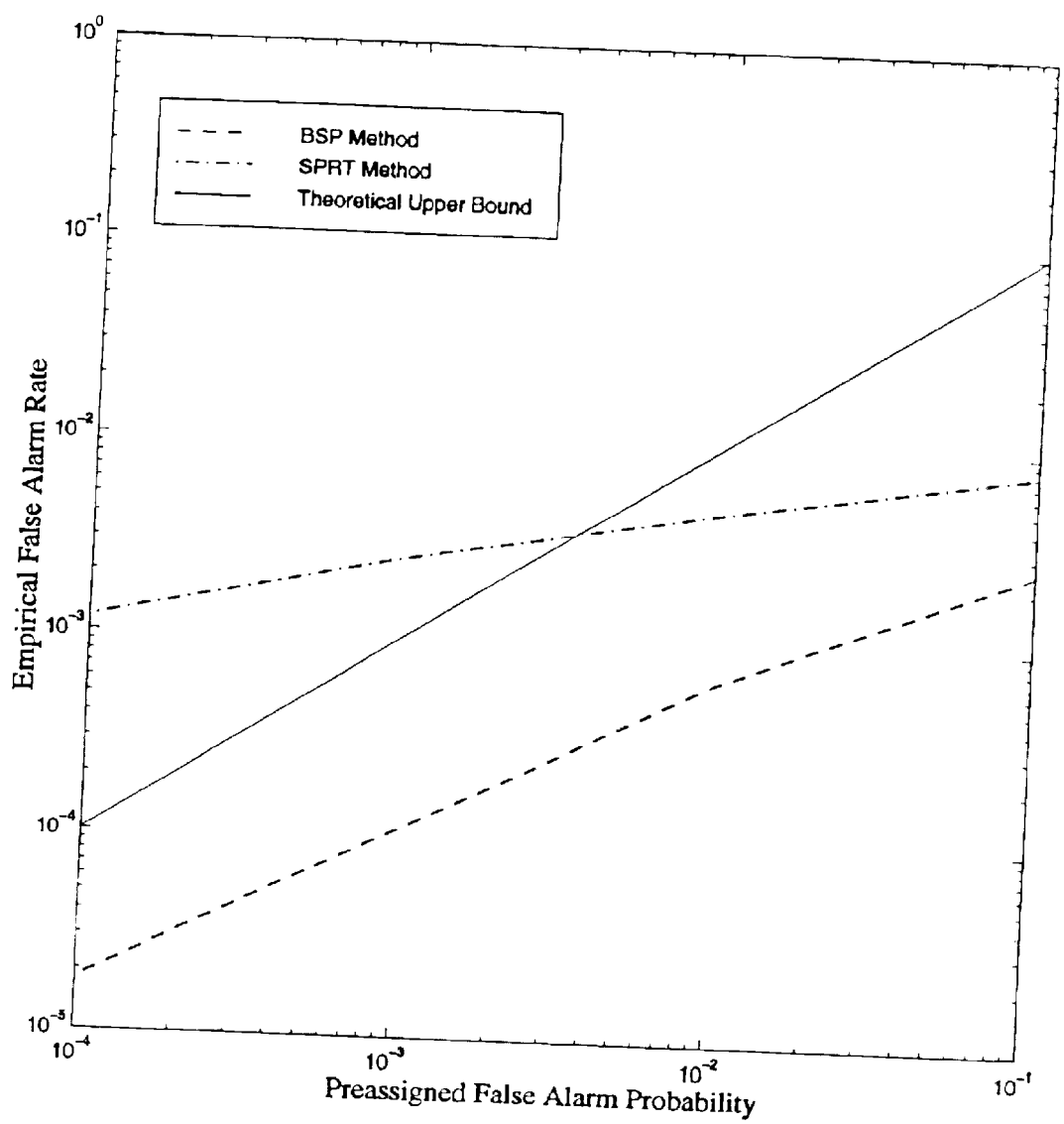
FIG. 20 illustrates the empirical false alarm rates for feasibility testing of a preferred embodiment in accordance with the instant invention with comparison to the prior art SPRT method.

Referring to FIG. 20, the results from the application of the positive mean SPRT and ASP tests to the residual signal from the first sensor are shown. The calculations shown in FIG. 20 were performed with a constant preassigned missed alarm probability ($\beta$) of 0.01, a constant system disturbance magnitude (M) of 6, and a variable preassigned false alarm probability ($\alpha$). The solid diagonal line in the figure represents the theoretical upper bound for the empirical false alarm probability, as defined by equation E39. For the SPRT calculation, the empirical false alarm rate satisfies the theoretical upper bound only for preassigned false alarm probabilities greater than 0.003. For smaller values of the preassigned false alarm probability, the SPRT model reaches more fault decisions than one would expect based on theoretical arguments. The theoretical upper bound for the empirical false alarm probability is not met for all values of the preassigned false alarm probability because the residual signals are not purely Gaussian, as confirmed in FIG. 13. The residual signal distribution has more data populating the tail regions than does a Gaussian distribution of the same mean, standard deviation, and area as the residual signal distribution. The data from the tail regions of a distribution are a major source of false alarms in the SPRT calculations, because they are more representative of the alternative hypothesis than they are of the normal hypothesis. Because the residual signals exhibit more heavily populated tail regions than true Gaussian distributions, they have a tendency to trigger more false alarms than anticipated, especially at high levels of sensitivity (i.e., small values of the false alarm probability). Because the optimized ASP method is tuned to the specific data distributions exhibited by the residual signals, the empirical false alarm rate for the ASP calculation satisfies the theoretical upper bound for all values of the preassigned false alarm probability. The ASP method produces fewer false alarms than the SPRT method for all values of the preassigned false alarm probability.

ASP Benefits and Applications

The Adaptive Sequential Probability (ASP) technique was developed as the fault detection element of a software program that reliably detects signal data faults for an asset, such as a process and/or apparatus. These signal validation modules improve safety, reduce maintenance cost, and enable optimal performance for a wide range of aeronautical, industrial, chemical, power generating, medical, biological, financial, and military assets. Signal validation is required in all types of process critical control and safety systems where unexpected process interruptions due to sensor or control component failures or false alarms are unsafe or uneconomical. Signal validation assures the safe, reliable operation of a process or apparatus and reduces the manpower, schedule and uncertainty associated with sensor and component failure detection. Signal validation prevents a facility safety or control system from making critical decisions, such as the decision to shut down a process or abort a mission, on the basis of bad sensor data. Signal validation improves process quality and efficiency by ensuring that closed loop control or data analysis is performed using good data. Finally, signal validation increases system up time and decreases system maintenance cost by enabling sensor calibration using on-condition criteria rather than time-in-service criteria.

Moreover, having thus described the invention, it should be apparent that numerous structural modifications and adaptations may be resorted to without departing from the scope and fair meaning of the instant invention as set forth hereinabove and as described herein below by the claims.

We claim:

1. A method for performing surveillance of an asset, the steps including:

acquiring residual data correlative to expected asset operation;

fitting an equation to said acquired residual data and storing said fitted equation in a memory means;

collecting a current set of observed signal data values from the asset;

using said fitted equation in a sequential hypotheses test to determine if said current set of observed signal data indicates unexpected operation of the asset that is indicative of a fault condition;

outputting a signal correlative to a detected fault condition for providing asset surveillance.

2. The method of claim 1 wherein the step of acquiring residual data correlative to expected asset operation includes acquiring training data values correlative to expected asset operation and obtaining deviations between said training data values and values obtained by using a parameter estimation model wherein said parameter estimation model values are a function of said training data values.

3. The method of claim 2 wherein the step of fitting an equation to said acquired residual data and storing said fitted equation in a memory means includes the step of fitting a general probability density function (PDF) to said acquired residual data such that said general PDF is a function of statistical moments of said residual data.

4. The method of claim 3 wherein the step of fitting said general PDF includes the step of fitting a function of a first statistical moment of said residual data, a function of a second statistical moment of said residual data, and a function of at least one higher order statistical moment of said residual data.

5. The method of claim 4 wherein said function of a first statistical moment of said residual data is a sample mean.

6. The method of claim 4 wherein said function of a second statistical moment of said residual data is a sample variance.

7. The method of claim 4 wherein said function of at least one higher order statistical moment of said residual data is a sample skewness.

8. The method of claim 4 wherein said function of at least one higher order statistical moment of said residual data is a sample kurtosis.

9. The method of claim 4 wherein said function of at least one higher order statistical moment of said residual data is a fifth or higher order statistical moment.

10. The method of claim 3 wherein the step of fitting an equation to said acquired residual data and storing said fitted equation in a memory means includes the step of fitting a general probability density function (PDF) to said acquired residual data by fitting a standard Gaussian PDF to said acquired residual data and by then adding successive higher order terms to said standard Gaussian PDF until an adequate agreement between the so derived general PDF and the actual distribution of said acquired residual data is achieved.

11. The method of claim 3 wherein the step of using said fitted equation in a sequential hypotheses test to determine if said current set of observed signal data indicates unexpected operation of the asset that is indicative of a fault condition further includes the step of performing at least one of a group of four sequential hypothesis tests comprised of a positive mean test, a negative mean test, a nominal variance test, and a inverse variance test all as a function of said general probability density (PDF) function.

12. The method of claim 11 wherein the step of performing at least one of a group of four sequential hypothesis tests comprised of a positive mean test, a negative mean test, a nominal variance test, and a inverse variance test all as a function of said general probability density function (PDF) includes the step of processing said at least one of a group of four sequential hypothesis tests and comparing an outcome of each processed test to upper and lower threshold limits for determining unexpected operation of the asset that is indicative of a fault condition.

13. A surveillance system for monitoring an asset, said system comprising in combination:

a data acquisition means for acquiring a current set of signals engendered from said asset correlative to asset status;

a digitizing means for digitizing said current set of signals for defining a current set of digitized signals;

a parameter estimation means for producing a set of estimated signal values as a function of said current set of digitized signals;

a fault detection means for detecting the presence of a fault as a function of said set of estimated signal values and said current set of digitized signals;

said fault detection means including a stored fault detection model comprised of an empirically derived probability density function utilized in a sequential probability test of at least one result of a mathematical operation between said set of estimated signal values and said current set of digitized signals;

a communication means for communicating detected faults to a remote location for providing asset surveillance.

14. The system of claim 13 wherein said parameter estimation means for producing said set of estimated signal values is of a type individually selected from a group comprised of a multivariate state estimation technique method, a neural network method, a mathematical process model method, a autoregressive moving average method, and a Kalman filter method.

15. The system of claim 14 wherein said empirically derived probability density function utilized in said sequential probability test is obtained by acquiring training data values correlative to expected asset operation and obtaining residual data by computing differences between said training data values and values obtained by using said parameter estimation model on said training data values and fitting a general probability density function (PDF) to said residual data.

16. The system of claim 15 wherein said fitted general PDF is a function of statistical moments of said residual data.

17. The system of claim 16 wherein said general PDF is a function of a first statistical moment of said residual data, of a second statistical moment of said residual data, and at least one higher order statistical moment of said residual data.

18. The system of claim 17 wherein said first statistical moment of said residual data is a sample mean.

19. The system of claim 17 wherein said second statistical moment of said residual data is a sample variance.

20. The system of claim 17 wherein said at least one higher order statistical moment of said residual data is a sample skewness.

21. The system of claim 17 wherein said at least one higher order statistical moment of said residual data is a sample kurtosis.

22. The system of claim 17 wherein said at least one higher order statistical moment of said residual data is a fifth or higher statistical moment.

23. The system of claim 15 wherein said general probability density function (PDF) of said acquired residual data is comprised of a standard Gaussian PDF and at least one higher order term to said standard Gaussian PDF.

24. A method for training a plurality of process models wherein each process model represents a set of parameter estimation models and a set of fault detection models of an asset to be monitored by a surveillance system, the steps including:

acquiring at least one set of signal values associated with a current status of said asset;

forming a training data set comprised of at least one said set of signal values;

providing a memory means for storing and retrieving said training data set;

processing said training data set comprised of at least one said set of signal values associated with said current status of said asset for training at least one parameter estimation model;

estimating at least one set of process parameters by using at least one said parameter estimation model for processing said training data set;

empirically fitting a general probability density function to at least one said set of signals values in said training data set as a function of at least one said estimated set of process parameters and said training data set for obtaining at least one empirically derived fault detection model; and storing within said memory means said at least one said parameter estimation model and at least one said empirically derived fault detection model for subsequent use in surveillance of said asset.

25. A method for performing surveillance of an asset, the steps including:

numerically fitting a probability density function to a distribution correlative to normal operation of the asset;

acquiring a current set of observed signal data values from the asset;

calculating a current set of estimated signal data values from a stored model for said asset;

transforming said calculated current set of estimated signal data values with said current set of observed signal data values for defining residual data values;

utilizing said fitted probability density function in a statistical hypothesis test performed on said residual data values for detecting a fault condition; and outputting a signal correlative to each detected fault condition for providing asset surveillance.

26. The method of claim 25 ether including a step of forming said stored model.

27. The method of claim 26 wherein the step of forming said stored model includes a step of preparing said stored model using historical operating data from the asset.

28. The method of claim 27 wherein the step of preparing said stored model using historical operating data from the asset further includes a step of creating a training data set having discrete observations correlative to the expected normal operation of the asset wherein each single observation is comprised of a vector of data values from a digitized set of signals correlative to each signal parameter to be included in said stored model.

29. The method of claim 28 wherein said step of forming said stored model includes a step of creating a parameter estimation model by training said stored model using said training data set.

30. The method of claim 25 wherein said step of numerically fitting a probability density function to a distribution correlative to normal operation of the asset includes a step of preparing said fitted probability density function using historical operating data from the asset.

31. The method of claim 30 wherein the step of preparing said fitted probability density function using historical operating data from the asset further includes a step of creating a training residual data set having discrete residual data values correlative to the expected normal operation of the asset wherein each residual data value is comprised of a deviation between a historical operating data signal value and a estimated signal value produced by said stored model for said asset.

32. The method of claim 31 wherein said step of forming said fitted probability density function includes a step of numerically determining an equation correlative to said training residual data set having discrete residual data values correlative to the expected normal operation of the asset.

* * * * *

UNITED STATES PATENT AND TRADEMARK OFFICE
CERTIFICATE OF CORRECTION

PATENT NO. : 6,892,163 B1
APPLICATION NO. : 10/095835
DATED : May 10, 2005
INVENTOR(S) : James P. Herzog and Randall L. Bickford It is certified that error appears in the above-identified patent and that said Letters Patent is hereby corrected as shown below:

Column 14, equation (E2) - should read:

$$-- \tilde{D} = \begin{bmatrix} d_{1,1} & d_{1,2} & \cdots & d_{1,m} \\ d_{2,1} & d_{2,2} & \cdots & d_{2,m} \\ \vdots & & & \vdots \\ d_{n,1} & d_{n,2} & \cdots & d_{n,m} \end{bmatrix} = [\vec{X}(t_1), \vec{X}(t_2), \ldots, \vec{X}(t_m)] \quad (E2) --$$

Column 15, equation (E5) - should read:

$$-- \vec{W} = (\tilde{D}^T \otimes \tilde{D})^{-1} \bullet (\tilde{D}^T \otimes \vec{X}_{obs}) \quad (E5) --$$

Column 15, equation (E6) - should read:

$$-- \vec{X}_{est} = \tilde{D} \bullet (\tilde{D}^T \otimes \tilde{D})^{-1} \bullet (\tilde{D}^T \otimes \vec{X}_{obs}) \quad (E6) --$$

Column 16, line 20 "$\sigma_2$" should read -- $\sigma^2$ --

Column 18, equation (E13) - should read:

$$-- \frac{P(H \mid e)}{P(\neg H \mid e)} = \frac{P(e \mid H)}{P(e \mid \neg H)} \frac{P(H)}{P(\neg H)}. \quad (E13) --$$

UNITED STATES PATENT AND TRADEMARK OFFICE
CERTIFICATE OF CORRECTION

PATENT NO.       : 6,892,163 B1
APPLICATION NO.  : 10/095835
DATED            : May 10, 2005
INVENTOR(S)      : James P. Herzog and Randall L. Bickford It is certified that error appears in the above-identified patent and that said Letters Patent is hereby corrected as shown below:

Column 19, line 8 "$P(y_1, y_2) = P(y_1, y_2) P(y_2)$" should read -- $P(y_1, y_2) = P(y_1 | y_2) P(y_2)$ --

Column 20, equation (E26) - should read:

$$-- \quad \Lambda_{1,n} = \prod_{i=1}^{n} \frac{P(y_i | H_1)}{P(y_i | H_0)}. \qquad (E26) \quad --$$

Column 22, equation (E35) - should read:

$$-- \quad A \geq \frac{\alpha}{(1-\beta)} \quad \text{and} \quad \frac{1}{B} \geq \frac{\beta}{(1-\alpha)}. \qquad (E35) \quad --$$

Column 22, equation (E37) - should read:

$$-- \quad \alpha' - \alpha'\beta \leq \alpha - \alpha\beta' \quad \text{and} \quad \beta' - \alpha\beta' \leq \beta - \alpha'\beta. \qquad (E37) \quad --$$

Column 23, line 58 "$\sigma_2$" should read -- $\sigma^2$ --

Column 26, equation (E48) - should read:

$$-- \quad \begin{aligned} P(y_i | H_1) &= S(y_i; M, \sigma^2, \ldots), \\ P(y_i | H_2) &= S(y_i; -M, \sigma^2, \ldots), \\ P(y_i | H_3) &= S(y_i; 0, V\sigma^2, \ldots), \\ P(y_i | H_4) &= S\left(y_i; 0, \frac{\sigma^2}{V}, \ldots\right). \end{aligned} \qquad (E48) \quad --$$

UNITED STATES PATENT AND TRADEMARK OFFICE
CERTIFICATE OF CORRECTION

PATENT NO. : 6,892,163 B1
APPLICATION NO. : 10/095835
DATED : May 10, 2005
INVENTOR(S) : James P. Herzog and Randall L. Bickford It is certified that error appears in the above-identified patent and that said Letters Patent is hereby corrected as shown below:

Column 27, equation (E51) - should read:

$$-- \ln \Lambda_{1,n} = \sum_{i=1}^{n} \ln \left[ \frac{\mathcal{G}(y_i; 0, V\sigma^2, \ldots)}{\mathcal{G}(y_i; 0, \sigma^2, \ldots)} \right] \equiv ASP_{n,n} . \quad (E51) --$$

Column 28 bridging onto Column 29, equation (E59) - should read:

$$-- \begin{aligned}
He_1(x) &= x, \\
He_2(x) &= x^2 - 1, \\
He_3(x) &= x^3 - 3x, \\
He_4(x) &= x^4 - 6x^2 + 3, \\
He_5(x) &= x^5 - 10x^3 + 15x, \\
He_6(x) &= x^6 - 15x^4 + 45x^2 - 15, \\
He_7(x) &= x^7 - 21x^5 + 105x^3 - 105x, \\
He_8(x) &= x^8 - 28x^6 + 210x^4 - 420x^2 + 105, \\
He_9(x) &= x^9 - 36x^7 + 378x^5 - 1260x^3 + 945x, \\
He_{10}(x) &= x^{10} - 45x^8 + 630x^6 - 3150x^4 + 4725x^2 - 945, \\
He_{11}(x) &= x^{11} - 55x^9 + 990x^7 - 6930x^5 + 17325x^3 - 10395x, \\
He_{12}(x) &= x^{12} - 66x^{10} + 1485x^8 - 13860x^6 + 51975x^4 - 62370x^2 + 10395. \\
& \quad (E59)
\end{aligned} --$$

Column 30, equation (E66) - should read:

$$-- y_i = y_{min} + i \frac{(y_{max} - y_{min})}{m}, \quad (E66) --$$

UNITED STATES PATENT AND TRADEMARK OFFICE
CERTIFICATE OF CORRECTION

PATENT NO. : 6,892,163 B1
APPLICATION NO. : 10/095835
DATED : May 10, 2005
INVENTOR(S) : James P. Herzog and Randall L. Bickford It is certified that error appears in the above-identified patent and that said Letters Patent is hereby corrected as shown below:

Column 31, equation (E68) - should read:

$$-- \quad E_{rms} = \left[ \frac{1}{m} \sum_{i=1}^{m} (S(x_i) - F(x_i))^2 \right]^{1/2}. \qquad (E68) \quad --$$

Column 31, lines 36 and 37 "$x_i = (y_1-\mu)/\sigma$, where $y_1$" should read
-- $x_i = (y_i-\mu)/\sigma$, where $y_i$ --

Signed and Sealed this

Twenty-sixth Day of August, 2008

JON W. DUDAS
*Director of the United States Patent and Trademark Office*